United States Patent
Materna et al.

(10) Patent No.: US 11,916,508 B1
(45) Date of Patent: Feb. 27, 2024

(54) UNDERGROUND PUMPED HYDRO STORAGE

(71) Applicant: AquaEnergy LLC, Metuchen, NJ (US)

(72) Inventors: Peter A Materna, Metuchen, NJ (US); Ralph L Hensler, New York, NY (US)

( * ) Notice: Subject to any disclaimer, the term of this patent is extended or adjusted under 35 U.S.C. 154(b) by 0 days.

(21) Appl. No.: 17/553,736

(22) Filed: Dec. 16, 2021

Related U.S. Application Data

(63) Continuation of application No. 16/921,900, filed on Jul. 6, 2020, now Pat. No. 11,218,109, which is a continuation of application No. 15/919,187, filed on Mar. 12, 2018, now Pat. No. 10,707,802.

(60) Provisional application No. 63/218,890, filed on Jul. 6, 2021, provisional application No. 63/127,132, filed on Dec. 17, 2020, provisional application No. 62/470,607, filed on Mar. 13, 2017, provisional application No. 62/470,603, filed on Mar. 13, 2017.

(51) Int. Cl.
| | | |
|---|---|---|
| *H02S 10/20* | (2014.01) | |
| *F03B 13/06* | (2006.01) | |
| *H02S 20/32* | (2014.01) | |
| *H02K 7/18* | (2006.01) | |
| *B65D 88/16* | (2006.01) | |

(52) U.S. Cl.
CPC .............. *H02S 10/20* (2014.12); *F03B 13/06* (2013.01); *H02K 7/1823* (2013.01); *H02S 20/32* (2014.12); *B65D 88/16* (2013.01)

(58) Field of Classification Search
CPC ................................. H02S 20/30; B65G 5/00
See application file for complete search history.

(56) References Cited

U.S. PATENT DOCUMENTS

| | | |
|---|---|---|
| 1,986,273 A | 1/1935 | Leffingwell |
| 3,330,118 A | 7/1967 | Biais |
| 3,416,762 A | 12/1968 | Headrick |
| (Continued) | | |

FOREIGN PATENT DOCUMENTS

| | | |
|---|---|---|
| CN | 101259905 A | 9/2008 |
| DE | 202006007438 U1 | 10/2006 |
| (Continued) | | |

OTHER PUBLICATIONS

Jan Olsen, Kasper Paasch, Benny Lassen, Christian T. Veje, A new principle for underground pumped hydroelectric storage, Journal of Energy Storage 2 (2015) 54-63, Jul. 14, 2015.

*Primary Examiner* — Thomas E Lazo
(74) *Attorney, Agent, or Firm* — Peter Materna

(57) ABSTRACT

An Underground Pumped Hydro Storage system may comprise a substrate, a large water-fillable bag, and an overburden causing pressure in the bag. The overburden may have nonuniformities of composition or dimension. Such nonuniformities may locally make overburden more flowable or gentle to the bag, at regions of relatively high shape change or flow during a cycle. Such nonuniformities may help prevent the overburden from freezing up in cold weather, or may enable a controlled progression of bag shapes. The overburden may have an irrigation hose buried in it.

The bag edge joint may have any of various features that provide for a transition of local bending and load distribution near the joint between the bag upper and lower layers. An antechamber may be provided for access to the bag interior for robotic inspection or maintenance. The system may be deployed near a dam on a river.

19 Claims, 25 Drawing Sheets

(56) References Cited

U.S. PATENT DOCUMENTS

| | | | |
|---|---|---|---|
| 3,736,754 A * | 6/1973 | Azalbert | B65D 88/76 52/2.17 |
| 3,996,741 A * | 12/1976 | Herberg | F03D 9/28 60/501 |
| 4,067,544 A | 1/1978 | Vetter et al. | |
| 4,068,480 A * | 1/1978 | Lefever | B65D 88/76 405/59 |
| 4,136,723 A | 1/1979 | Skaadel et al. | |
| 4,206,608 A * | 6/1980 | Bell | F03D 9/17 290/55 |
| 4,231,873 A * | 11/1980 | Swigger | E02B 1/00 210/205 |
| 4,247,220 A | 1/1981 | Furman | |
| 4,362,199 A | 12/1982 | Futerman | |
| 4,372,533 A | 2/1983 | Knaus et al. | |
| 4,390,051 A | 6/1983 | Cuthbertson | |
| 4,542,626 A * | 9/1985 | Colin | F17C 13/12 165/45 |
| 4,781,475 A | 11/1988 | LaFleur | |
| 4,948,107 A | 8/1990 | Orndorff | |
| 5,157,922 A | 10/1992 | Rosenberg | |
| 5,316,387 A | 5/1994 | Polett et al. | |
| 5,323,922 A | 6/1994 | LaPoint, Jr. et al. | |
| 5,328,268 A | 7/1994 | LaFleur | |
| 5,506,012 A | 4/1996 | Wright et al. | |
| 5,685,644 A | 11/1997 | Taylor | |
| 5,785,175 A | 7/1998 | Cholsaipant | |
| 5,865,564 A | 2/1999 | Miller et al. | |
| 5,885,679 A | 3/1999 | Miller et al. | |
| 5,987,370 A | 11/1999 | Murphy et al. | |
| 6,004,035 A | 12/1999 | Hafer et al. | |
| 6,015,057 A | 1/2000 | Stone et al. | |
| 6,186,701 B1 | 2/2001 | Kempers | |
| 6,203,198 B1 | 3/2001 | Stone | |
| 6,220,755 B1 | 4/2001 | Brown et al. | |
| 6,269,505 B1 | 8/2001 | Wilkinson | |
| 6,402,378 B1 | 6/2002 | Shackleton | |
| 6,513,418 B1 | 2/2003 | Simmons et al. | |
| 6,565,256 B2 | 5/2003 | Derby et al. | |
| 6,739,274 B2 | 5/2004 | Eagles et al. | |
| 6,739,753 B2 | 5/2004 | Richardson, Jr. et al. | |
| 6,783,300 B2 * | 8/2004 | Doolaege | E02B 7/20 405/91 |
| 6,860,068 B2 | 3/2005 | Halloran | |
| 6,935,500 B1 | 8/2005 | Schnaars | |
| 6,935,782 B2 | 8/2005 | Cholsaipant | |
| 6,996,937 B2 | 2/2006 | Halloran | |
| 7,003,955 B2 | 2/2006 | Davis | |
| 7,073,374 B2 | 7/2006 | Berkman | |
| 7,114,879 B2 | 10/2006 | Obermeyer | |
| 7,360,266 B2 | 4/2008 | Kasatshko | |
| 7,503,885 B2 | 3/2009 | Reicin et al. | |
| 7,506,776 B2 | 3/2009 | Podd | |
| 7,770,331 B2 | 8/2010 | Halloran | |
| 7,815,219 B2 | 10/2010 | Breed et al. | |
| 8,287,209 B2 * | 10/2012 | Feldman | E02B 3/127 405/21 |
| 8,341,786 B2 | 1/2013 | Oexman et al. | |
| 8,485,757 B2 | 7/2013 | Nomoto | |
| 8,496,810 B2 | 7/2013 | Forrest | |
| 8,678,652 B1 | 3/2014 | Nattrass | |
| 8,698,338 B2 | 4/2014 | Slocum et al. | |
| 8,777,523 B2 | 7/2014 | Stephens et al. | |
| 8,950,181 B2 * | 2/2015 | Ivy | B65G 5/00 60/415 |
| 8,966,689 B2 | 3/2015 | McGuire et al. | |
| 9,353,496 B2 | 5/2016 | Miller | |
| 9,394,885 B2 | 7/2016 | Wood | |
| 9,410,559 B2 | 8/2016 | VanWalleghem et al. | |
| 9,416,796 B2 | 8/2016 | VanWalleghem et al. | |
| 9,475,556 B1 | 10/2016 | Pirtle | |
| 9,611,867 B2 * | 4/2017 | Ivy | F03G 3/00 |
| 9,719,225 B2 | 8/2017 | Abeles | |
| 9,784,413 B2 | 10/2017 | Lewis et al. | |
| 9,982,406 B2 | 5/2018 | Bradley, Sr. et al. | |
| 10,029,848 B2 | 7/2018 | Yaremenko et al. | |
| 10,081,998 B2 | 9/2018 | Tunget | |
| 10,233,897 B2 | 3/2019 | Stenzel | |
| 10,288,221 B2 * | 5/2019 | Donelick | F03D 9/28 |
| 10,707,802 B1 * | 7/2020 | Materna | H02S 20/32 |
| 10,806,655 B2 | 10/2020 | Meyer et al. | |
| 2005/0034452 A1 * | 2/2005 | Davis | F03B 3/103 60/398 |
| 2005/0151351 A1 | 7/2005 | Enders et al. | |
| 2006/0165320 A1 | 7/2006 | Stephens | |
| 2008/0001130 A1 | 1/2008 | Dibdin | |
| 2008/0136186 A1 * | 6/2008 | Gogoana | F15B 1/024 290/43 |
| 2010/0175741 A1 * | 7/2010 | Thorne | H02S 20/32 136/251 |
| 2011/0044564 A1 | 2/2011 | Lin | |
| 2011/0070031 A1 | 3/2011 | Frazier et al. | |
| 2011/0113769 A1 * | 5/2011 | Olsen | F03B 13/06 60/416 |
| 2014/0042753 A1 * | 2/2014 | Bahner | F03D 9/255 290/1 R |
| 2014/0263345 A1 | 9/2014 | Morgan | |
| 2015/0125210 A1 * | 5/2015 | Ingersoll | F02C 6/16 405/55 |
| 2016/0025115 A1 | 1/2016 | Ali | |
| 2016/0281925 A1 * | 9/2016 | Donelick | F17C 13/081 |
| 2017/0167096 A1 * | 6/2017 | Obermeyer | F16G 1/06 |

FOREIGN PATENT DOCUMENTS

| | | |
|---|---|---|
| DK | 179739 B1 | 4/2019 |
| EP | 0034023 A1 | 8/1981 |
| KR | 101268681 B1 | 5/2013 |
| WO | 1988010232 A1 | 12/1988 |
| WO | 2010003412 A2 | 1/2010 |
| WO | 2015042616 A1 | 3/2015 |
| WO | 2016040731 A1 | 3/2016 |
| WO | 2016116625 A1 | 7/2016 |
| WO | 2019068293 A1 | 4/2019 |

* cited by examiner

Energy stored

Energy partially stored

Energy discharged

Energy stored

Energy partially stored

Energy discharged

Energy stored

Energy partially stored

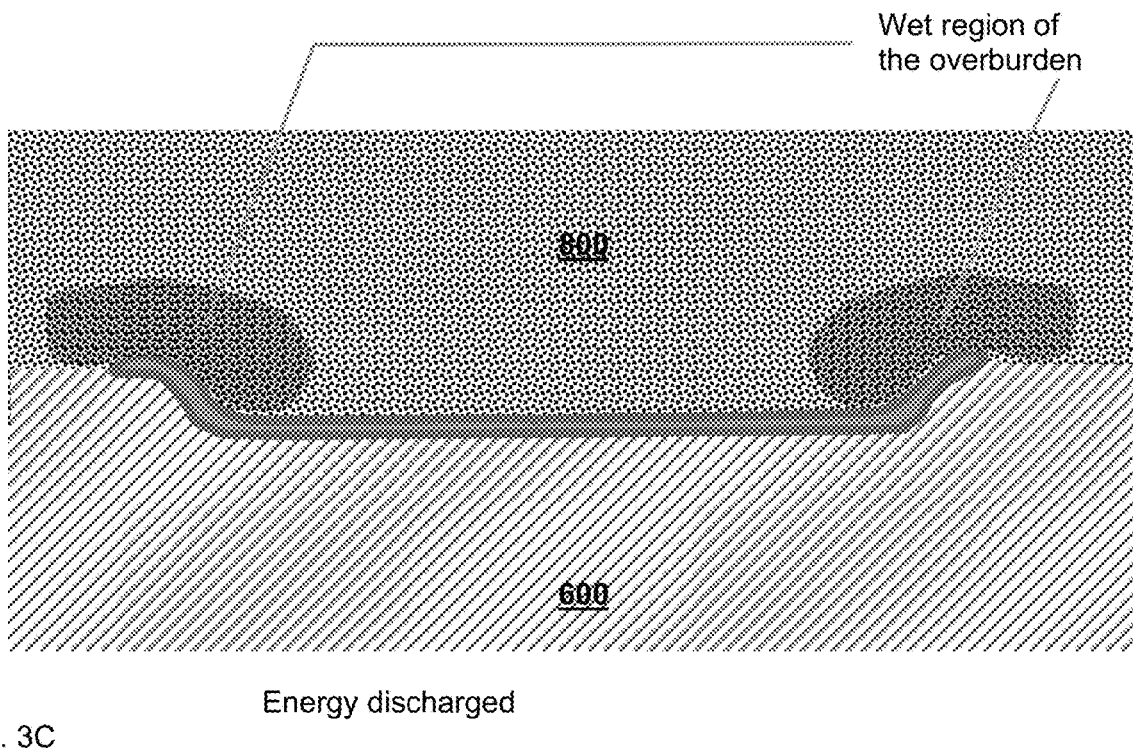
Fig. 3C   Energy discharged
Fig. 3D
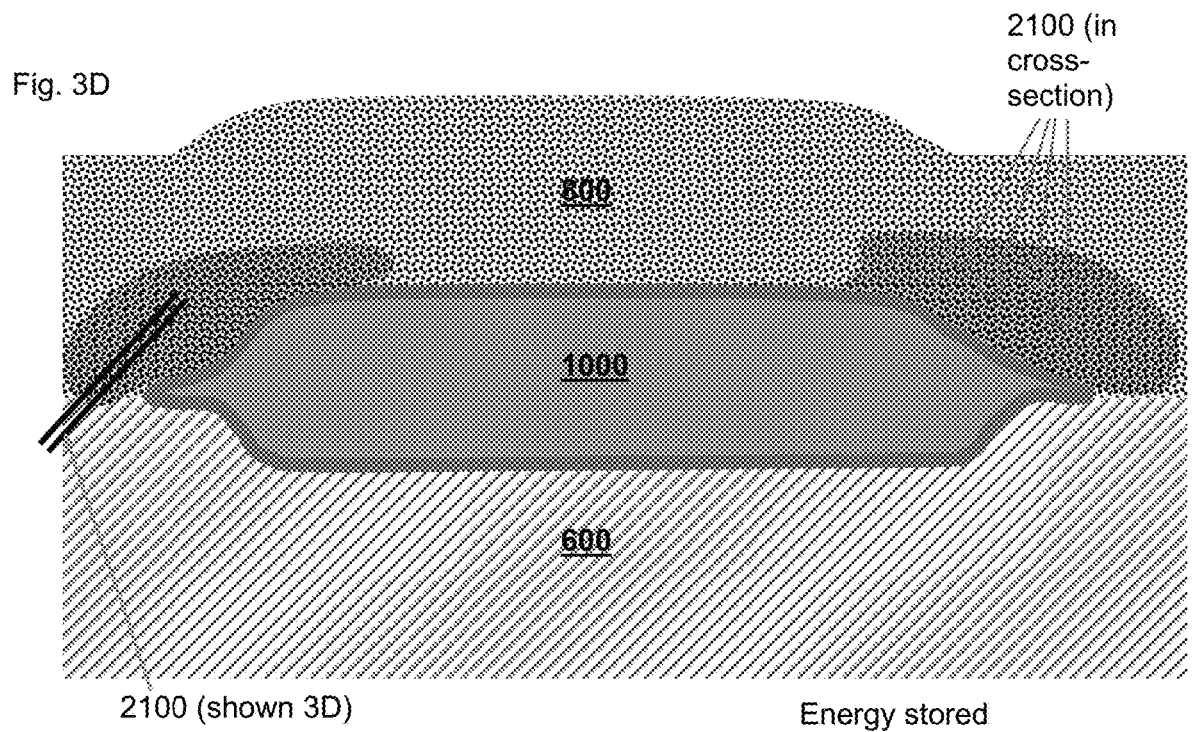
2100 (shown 3D)   Energy stored Fig. 4A
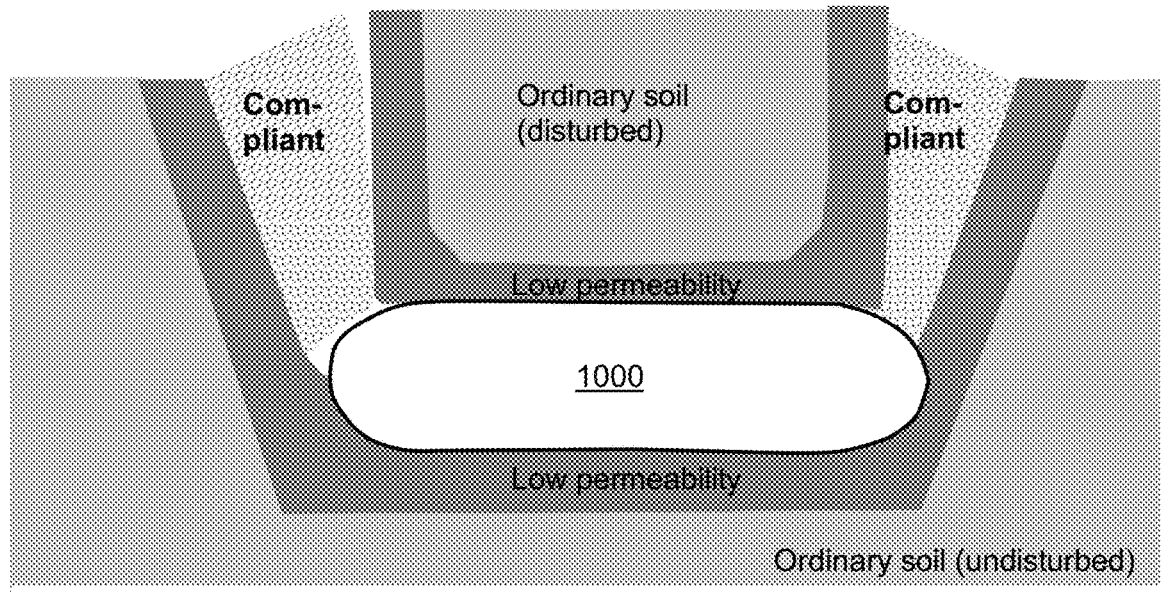
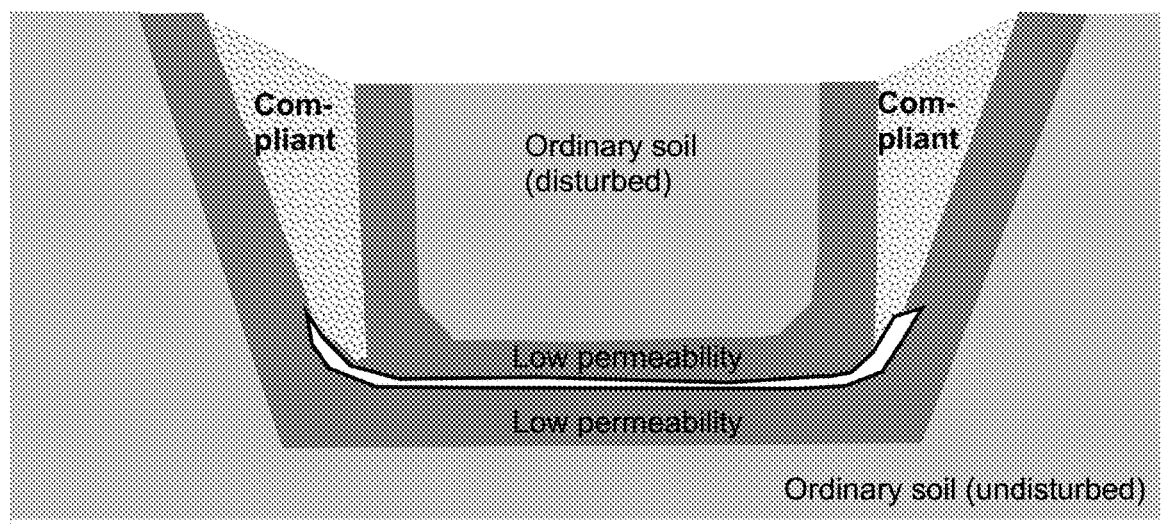
Fig. 4B

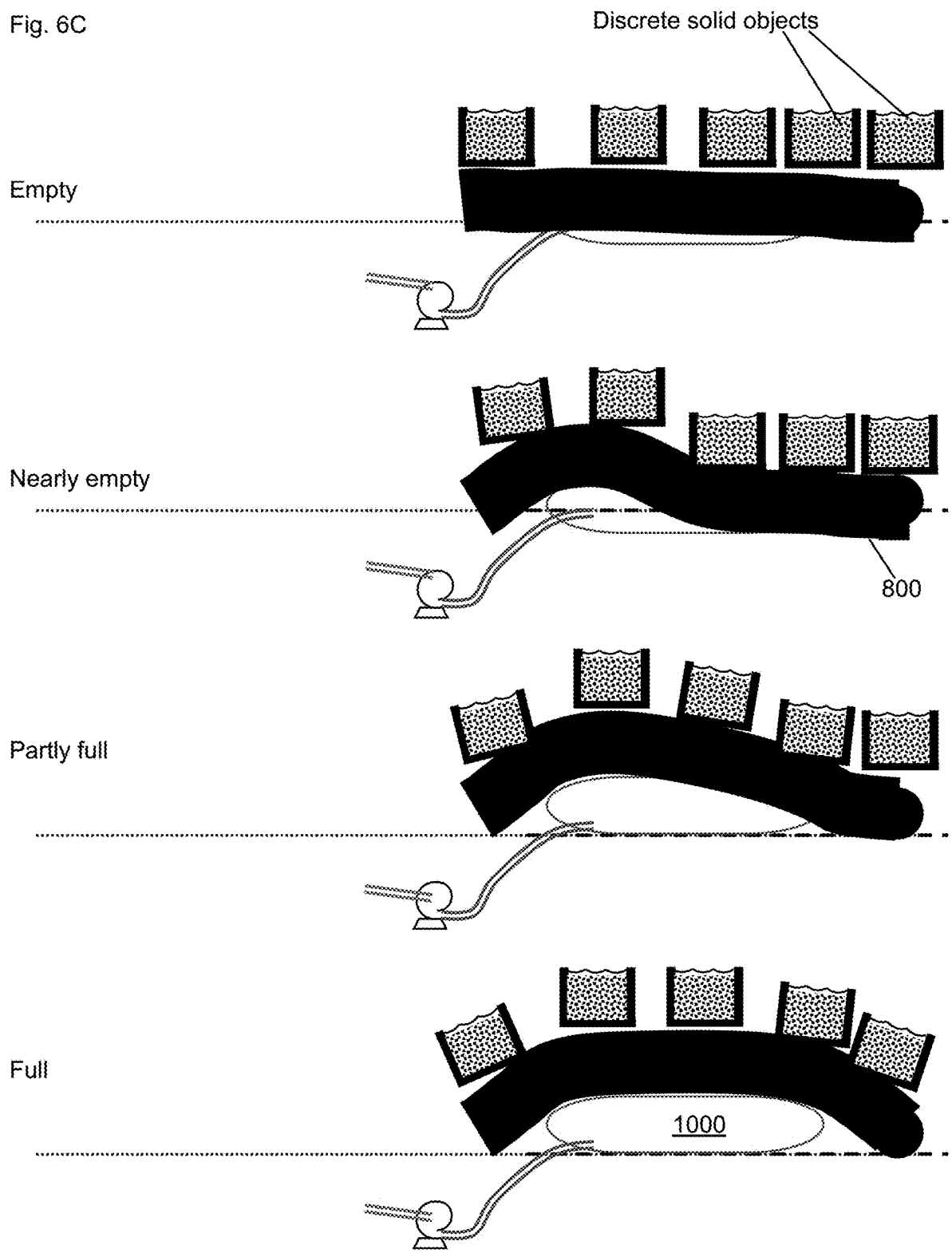

Moment arm distance

1050

Fig. 10A
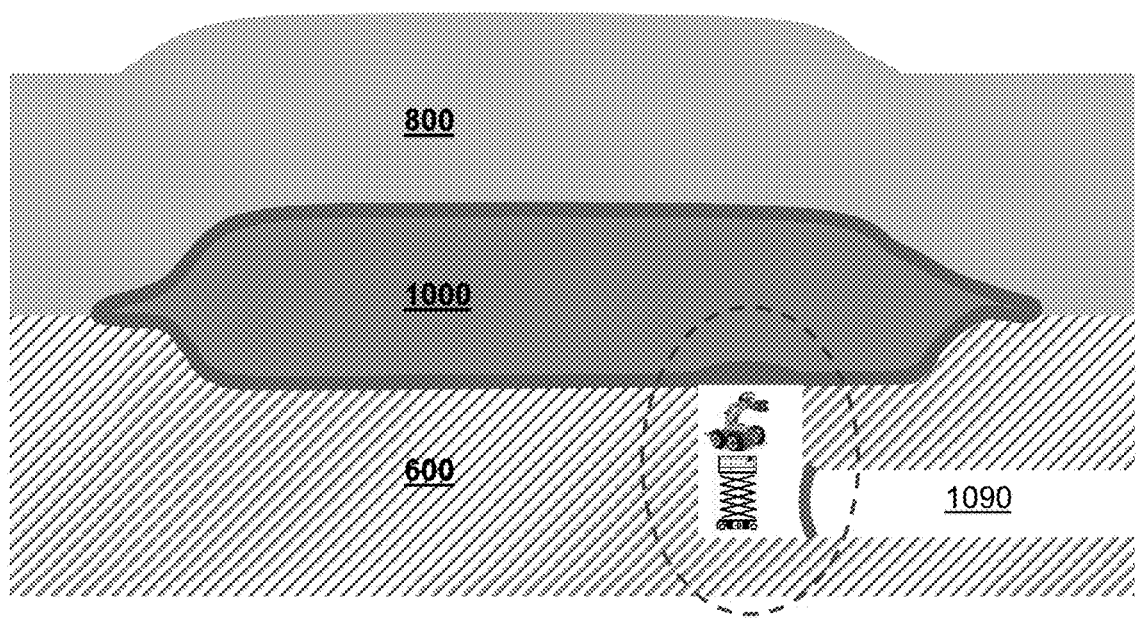
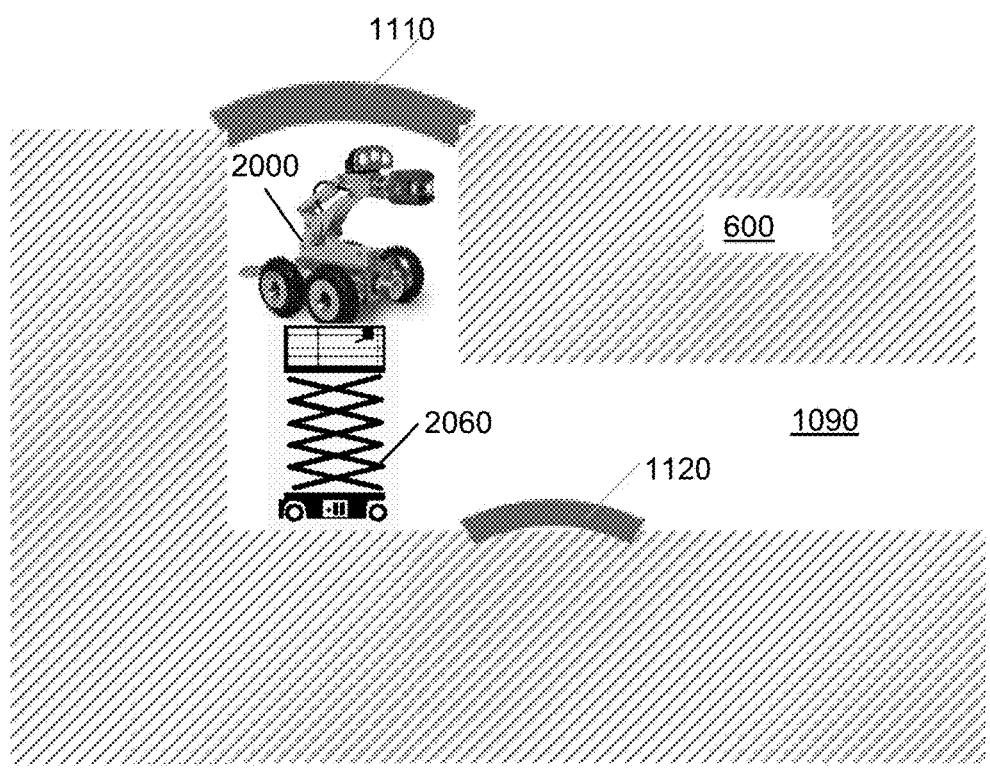
Fig. 10B

Fig. 10C
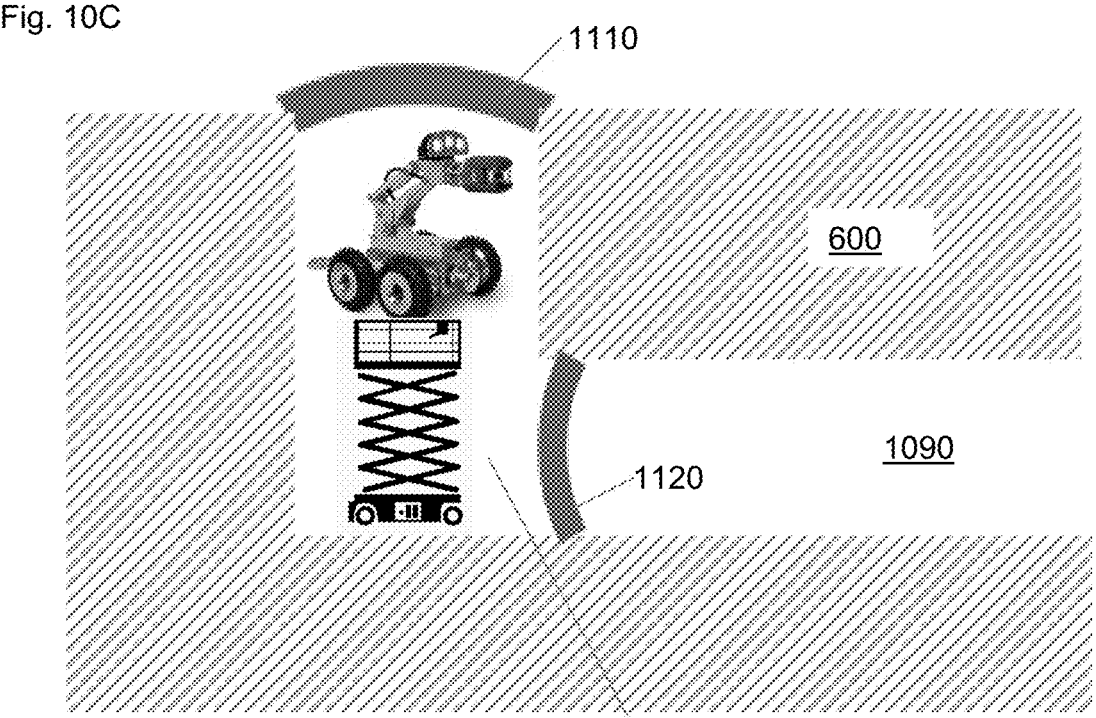
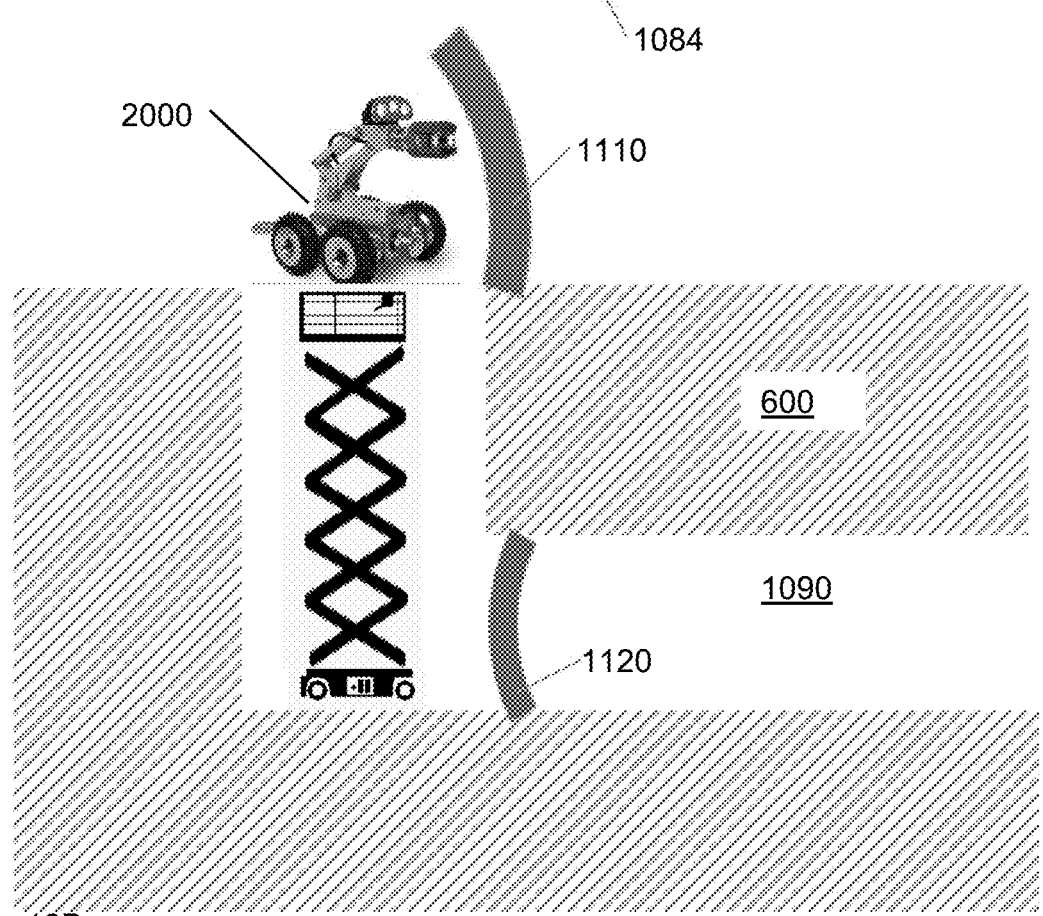
Fig. 10D

UNDERGROUND PUMPED HYDRO STORAGE

CROSS-REFERENCE TO RELATED APPLICATIONS

This application claims the benefit of U.S. provisional Ser. No. 63/127,132 filed Dec. 17, 2020 titled Improvements in Underground Pumped Hydro Storage. This application also claims the benefit of U.S. provisional Ser. No. 63/218,890 filed Jul. 6, 2021, titled Multi-ply edge joint for Underground Pumped Hydro Storage. This application is a Continuation-in-Part of U.S. patent application Ser. No. 16/921,900, filed Jul. 6, 2020, titled Pressurized Pumped Hydro Storage System, which is a Continuation of U.S. patent application Ser. No. 15/919,187, filed Mar. 12, 2018, titled Pressurized pumped hydro storage system, now issued as U.S. Pat. No. 10,707,802. U.S. Pat. No. 10,707,802 claims the benefit of U.S. provisional patent application Ser. No. 62/470,603, filed Mar. 13, 2017, titled Pressurized Water Pumped Storage Hydro System, and U.S. provisional patent application Ser. No. 62/470,607, filed Mar. 13, 2017, titled Pressurized Water Pumped Storage Hydro System including longitudinally elongated bags. All of these are incorporated by reference herein in their entirety.

FIELD OF THE INVENTION

Embodiments of the invention pertain to storage of energy and/or of water.

BACKGROUND OF THE INVENTION

As renewable and time-varying energy sources come into more widespread use, there is increasing need for energy storage. Currently, conventional pumped hydro storage represents the overwhelming majority of energy storage that is in service today, and the generating capacity of pumped storage hydro amounts to several percent of the total generating capacity of the entire electric power grid. However, conventional pumped hydro storage has geographical limitations requiring elevation differences such as occur in mountainous terrain, and new sites for pumped storage hydro are often non-optimal for reasons of topography, location or environmental sensitivity. As an example, in the Midwestern United States, there is currently an oversupply of wind energy, but the terrain is generally flat. It would be desirable to allow the use of pumped storage technology in more locations including at sites that are not mountainous.

A known effort of this type is published by Olsen as US patent application 20110113769 and WO2010003412A2, and also as "A new principle for underground pumped hydroelectric storage," by Jan Olsen, Journal of Energy Storage 2 (2015) 54-63). However, improvements are still needed in this technology.

SUMMARY OF THE INVENTION

In an embodiment, there may be provided an energy or fluid storage system comprising: a bag comprising a deformable boundary defining an interior that can be filled with the fluid and emptied of the fluid as desired, the bag being capable of occupying a less-filled configuration and a more-filled configuration; and a mass of overburden overlying the bag, the overburden being able to be raised and lowered as a function of a degree of filling of the interior of the bag, wherein the overburden has a variation in composition or particle size or particle size distribution from one location in the overburden to another location in the overburden. The variation in the overburden can be such as to provide a certain property, such as composition, fineness, wetness, at certain regions in the overburden that are subject to relatively large local deformation or flow during a filling-emptying cycle. The variation in the overburden can be such as to discourage freeze-up of the uppermost portion of the overburden during cold weather. The variation in the overburden can be of local overburden density such as to promote a progressive filling/emptying pattern of the bag.

In an embodiment, there may be provided an energy or fluid storage system comprising: a bag, the bag comprising a deformable boundary defining a bag interior that can be filled with the fluid and emptied of the fluid as desired; a mass of overburden overlying the bag, the mass being able to be raised and lowered as a function of an extent of filling of the bag interior; and an irrigation hose buried within the overburden, wherein the irrigation hose is capable of delivering a liquid to specific locations within the overburden, and wherein the overburden has local flowability properties that are responsive to an amount of the liquid that has been delivered to local places within the overburden.

In an embodiment, there may be provided an energy or fluid storage system comprising: a bag comprising a deformable boundary defining a bag interior that can be filled with the fluid and emptied of the fluid as desired, the bag being capable of occupying a less-filled configuration and a more-filled configuration; and a mass of overburden overlying the bag, the overburden being able to be raised and lowered as a function of a degree of filling of the bag interior, wherein the overburden is such as to exert a local pressure on the bag that is distributed nonuniformly over the bag. This can include a taper in the thickness of the overburden.

In an embodiment, there may be provided an energy or fluid storage system comprising: a substrate, the substrate having a concave shape when viewed from above; a bag, overlying the substrate, the bag comprising a deformable boundary defining a bag interior that can be filled with the fluid and emptied of the fluid as desired, the bag comprising a bag upper layer and a bag lower layer; and a mass of overburden overlying the bag upper layer, the mass being able to be raised and lowered as a function of an extent of filling of the bag interior, wherein the bag lower layer and the bag upper layer are joined to each other at an edge of the bag with a face-to-face joint, and further comprising an edge support structure that is in contact with the bag upper layer and is in contact with the bag lower layer, wherein the edge support structure exerts force on the upper layer and the lower layer, urging the upper layer and the lower layer toward each other, at a place where the bag upper layer and the bag lower layer are not joined to each other.

In an embodiment, there may be provided a storage system comprising: a bag comprising a bag upper layer and a bag lower layer, the bag upper layer and the bag lower layer being joined to each other at an edge joint, the bag defining a bag interior space, the bag being capable of occupying a less-filled configuration and a more-filled configuration; a substrate that supports the bag lower layer and the edge joint, the substrate being generally immovable during change between the less-filled configuration and the more-filled configuration; an overburden, the over burden overlying the bag upper layer and the edge joint, at least some of the overburden being movable in response to a change between the less-filled configuration and the more-filled configuration; wherein the edge joint comprises a downward-facing surface of the bag upper layer joined to an upward-facing surface of the bag lower layer, the edge joint having an inner end and an outer end, the inner end helping to define the bag interior, wherein the bag further comprises a supplemental bag upper layer wherein the bag supplemental upper layer is joined to at least a portion of the edge joint and wherein the bag supplemental upper layer extends some distance inboard of the edge joint.

In an embodiment, there may be provided an energy or fluid storage system comprising: a substrate, the substrate having a concave shape when viewed from above; a bag, overlying the substrate, the bag comprising a deformable boundary defining a bag interior that can be filled with the fluid and emptied of the fluid as desired, the bag comprising a bag upper layer and a bag lower layer; and a mass of overburden overlying the bag upper layer, the overburden being able to be raised and lowered as a function of an extent of filling of the bag interior, wherein the bag upper layer is connected to an edge piece which in turn is connected to the bag lower layer, wherein the edge piece comprises features that are thicker than the bag lower layer and thicker than the bag upper layer.

In an embodiment, there may be provided an energy or fluid storage system comprising: a bag comprising a bag upper layer and a bag lower layer that are joined to each other to define a bag interior that can be filled with the fluid and emptied of the fluid as desired, the lower layer resting on the substrate, wherein the bag lower layer has an access hole therethrough; a passageway through the substrate providing access to the access hole; a first pressure boundary door that can cover the access hole and can withstand an operating pressure inside the bag; and a second pressure boundary door that can block the passageway and can withstand the operating pressure inside the bag. The first pressure boundary door and the second pressure boundary door can partially define an antechamber that can contain a machine or robotic device for performing inspection or maintenance on interior surfaces of the bag.

In an embodiment, there may be provided a system for storing or producing energy, the system comprising: a river having an elevation difference from an upstream point to a downstream point; a deformable bag defining a bag interior that is capable of occupying a less-filled configuration and a more-filled configuration; an energy conversion device; a first fluid conduit in fluid communication with the river at the upstream point, and a second fluid conduit in fluid communication with the river at the downstream point and a third fluid conduit in fluid communication with the energy conversion device; and valving suitable to provide any of various flowpaths as desired between the upstream point, the downstream point and the deformable bag.

BRIEF DESCRIPTION OF THE ILLUSTRATIONS

Embodiments of the invention are further described, but are in no way limited, by the following illustrations.

FIG. 1A shows an embodiment of the invention, with a uniform overburden, in a situation in which the bag is full. FIG. 1B shows the same in a situation in which the bag in approximately half full. FIG. 1C shows the same in a situation in which the bag in nearly empty. FIG. 1D shows a possible shape of the substrate, in the absence of the bag.

FIG. 2A shows an embodiment of the invention, in which the overburden has fine particles in a certain region, in a situation in which the bag is full. FIG. 2B shows the same in a situation in which the bag in approximately half full. FIG. 2C shows the same in a situation in which the bag in nearly empty.

FIG. 3A shows an embodiment of the invention, in which the overburden is locally wet in a certain region, in a situation in which the bag is full. FIG. 3B shows the same in a situation in which the bag in approximately half full. FIG. 3C shows the same in a situation in which the bag in nearly empty. FIG. 3D shows a buried irrigation system.

FIG. 4A shows a compliant region within the overburden, for a situation in which the bag is full. FIG. 4B shows the same in a situation in which the bag in nearly empty.

Figure 6A:
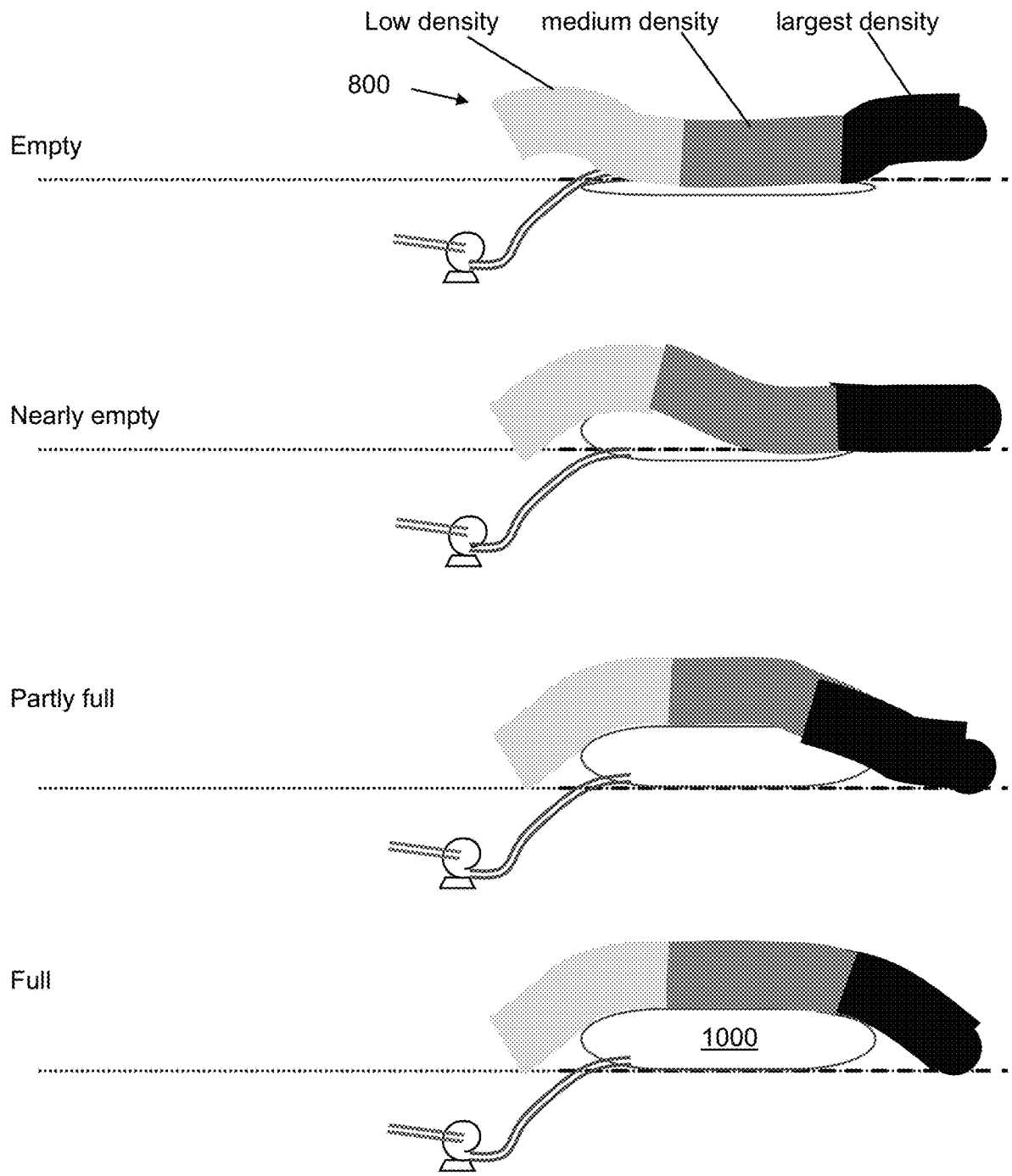
Figure 6B:
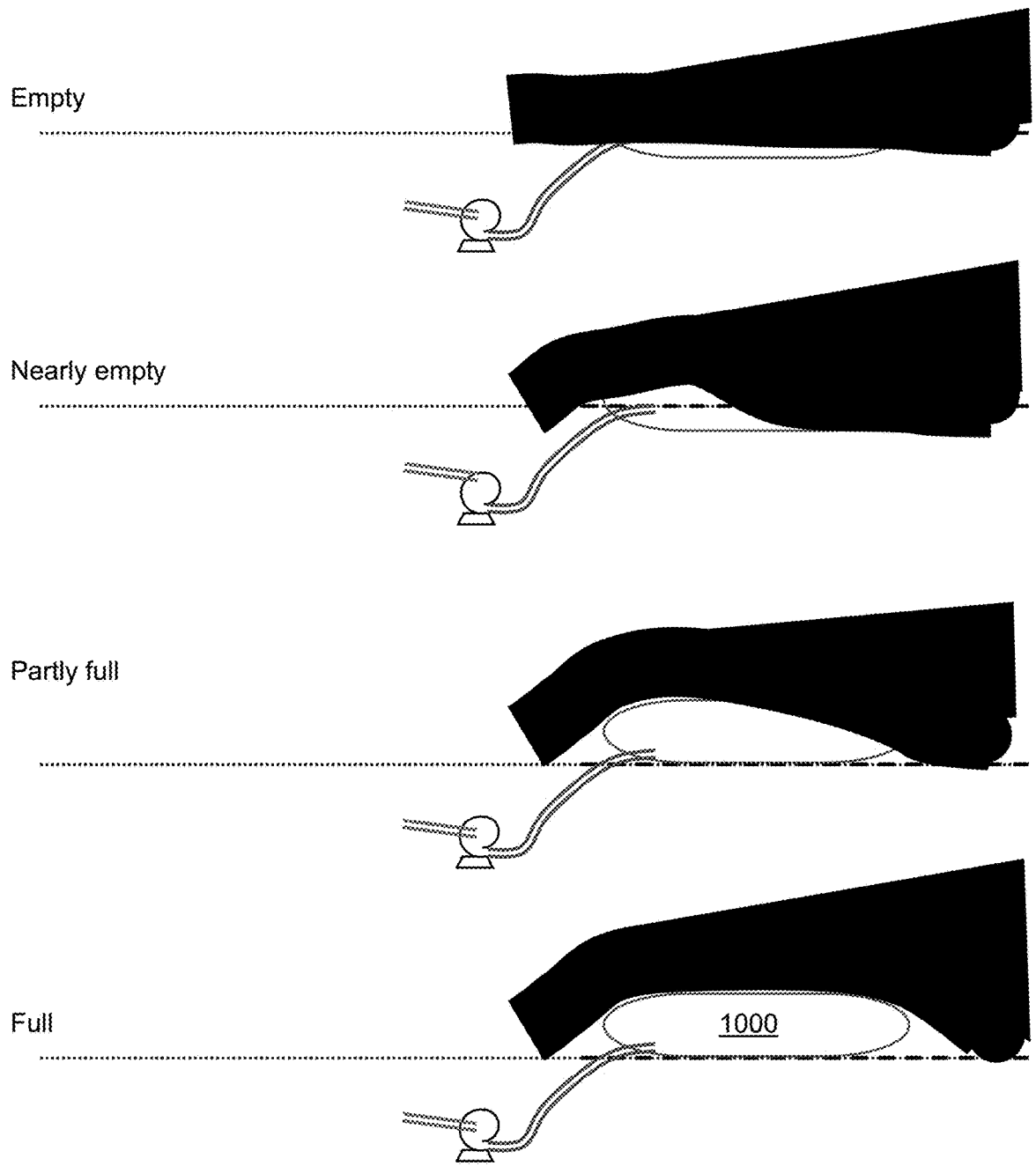

FIG. 6A shows, for a progression of states of filling of the bag in which the bag begins filling at a particular place and filling progresses in a certain direction, resulting from a variation of density of the overburden. FIG. 6B shows the same resulting from a variation of thickness of the overburden. FIG. 6C shows the same resulting from a variation of placement of supplemental masses placed on a uniform overburden.

Figure 7A:
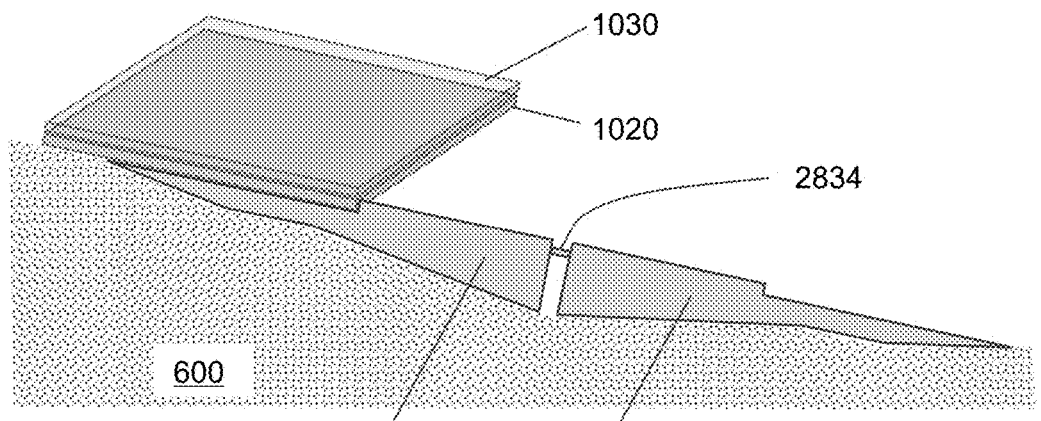
Figure 7B:
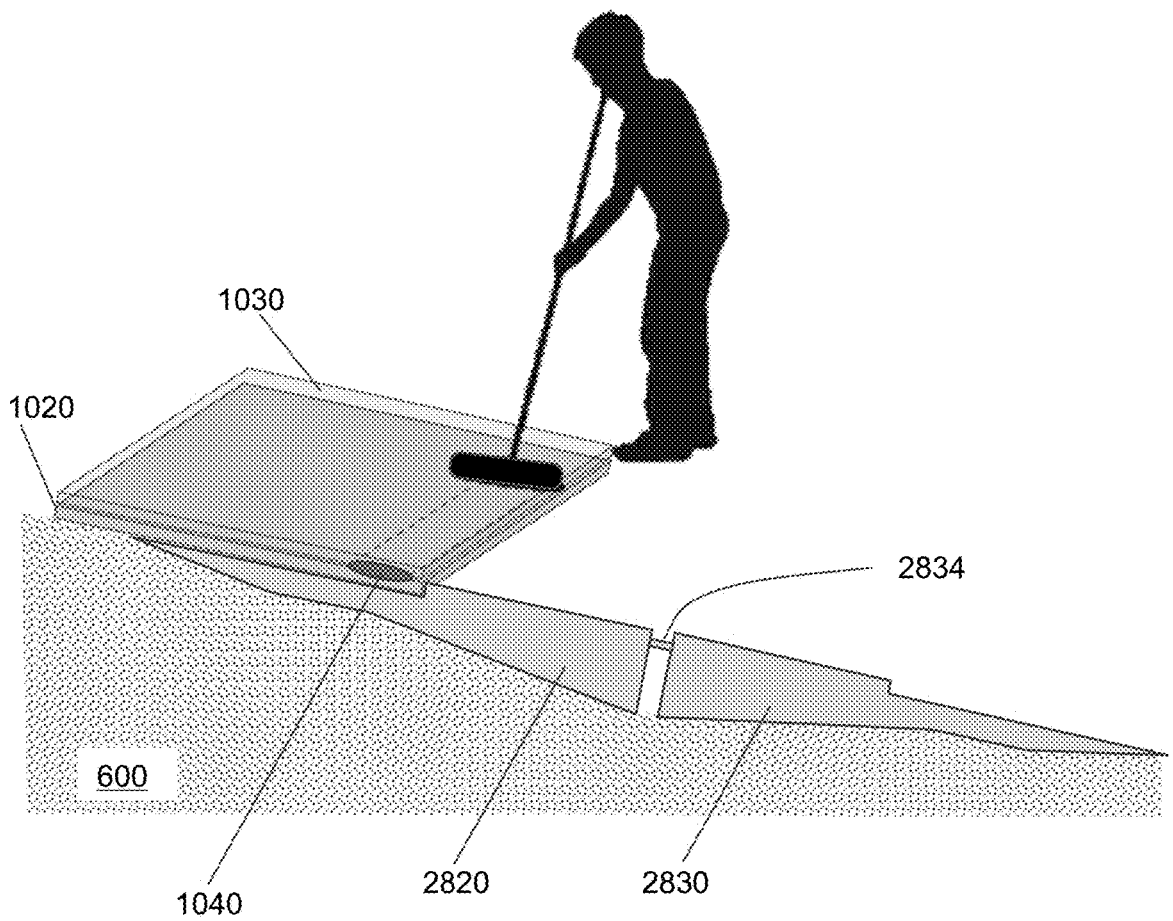
Figure 7C:
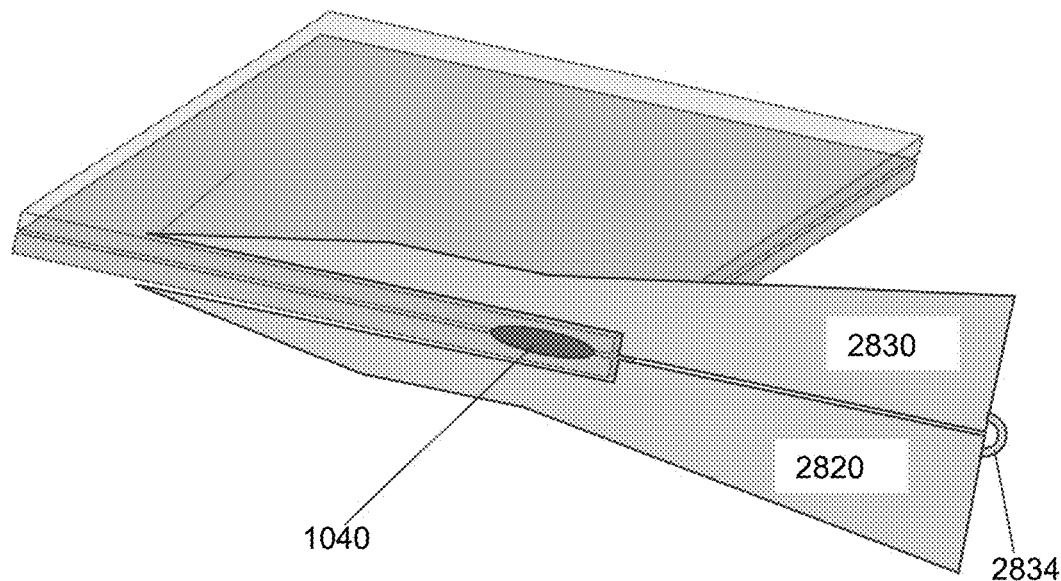
Figure 7D:
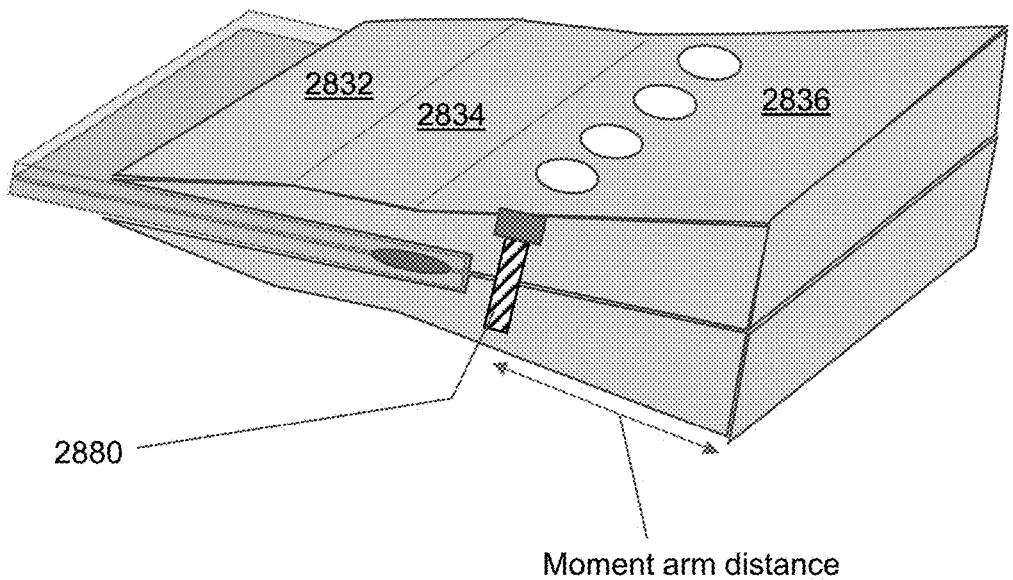
Figure 7E:
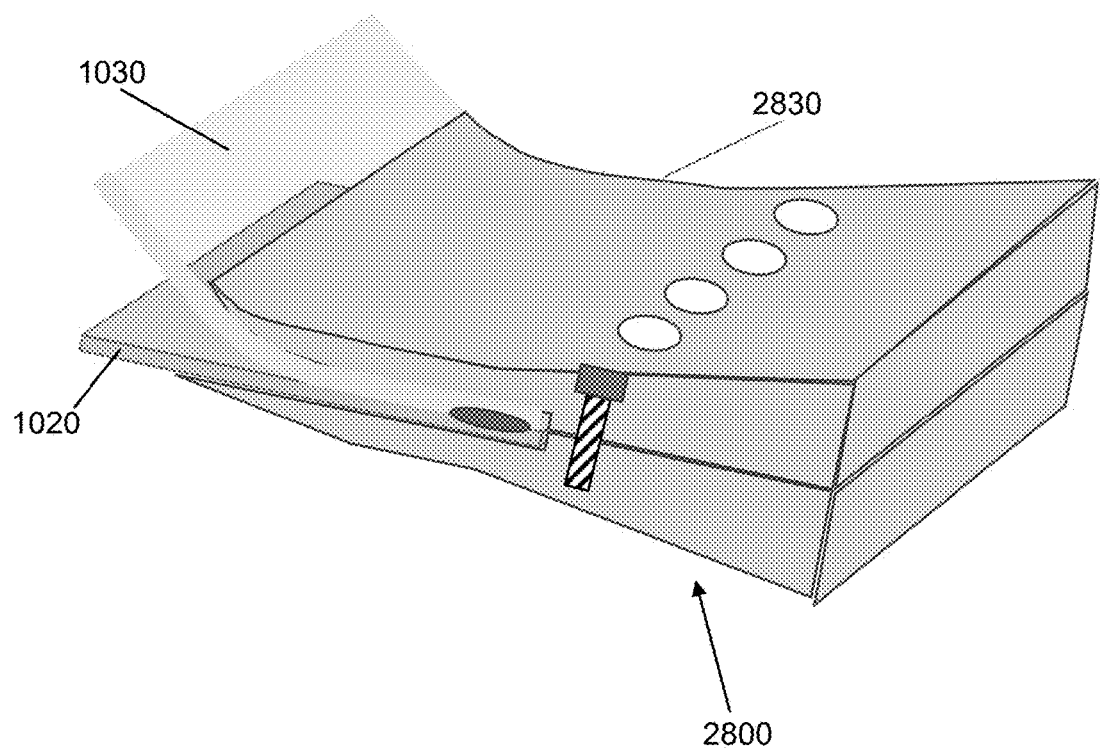

FIG. 7A shows an edge support structure placed under a bag lower layer and a bag upper layer, in preparation for welding or joining. FIG. 7B shows the same during welding or joining. FIG. 7C shows the edge support structure closed after the welding or joining. FIG. 7D shows the same after installation of bolts to fully assemble the edge support structure. FIG. 7E shows the completed edge support structure in which the bag is at least partially full, showing the edge support structure and supporting the bag near the weld or joint while the edge support structure is slightly separated.

Figure 8A:
Figure 8B:
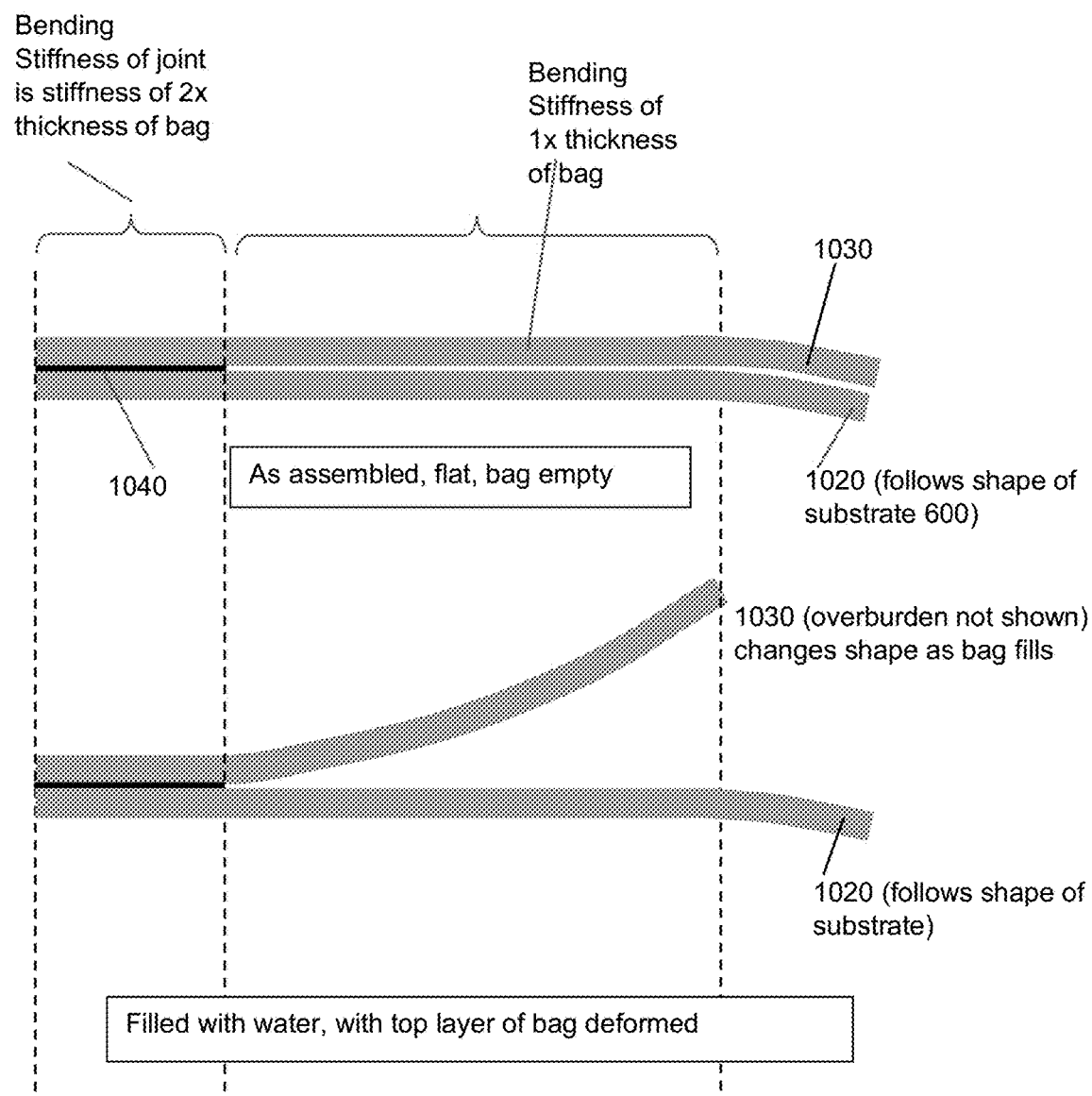
Figure 8C:
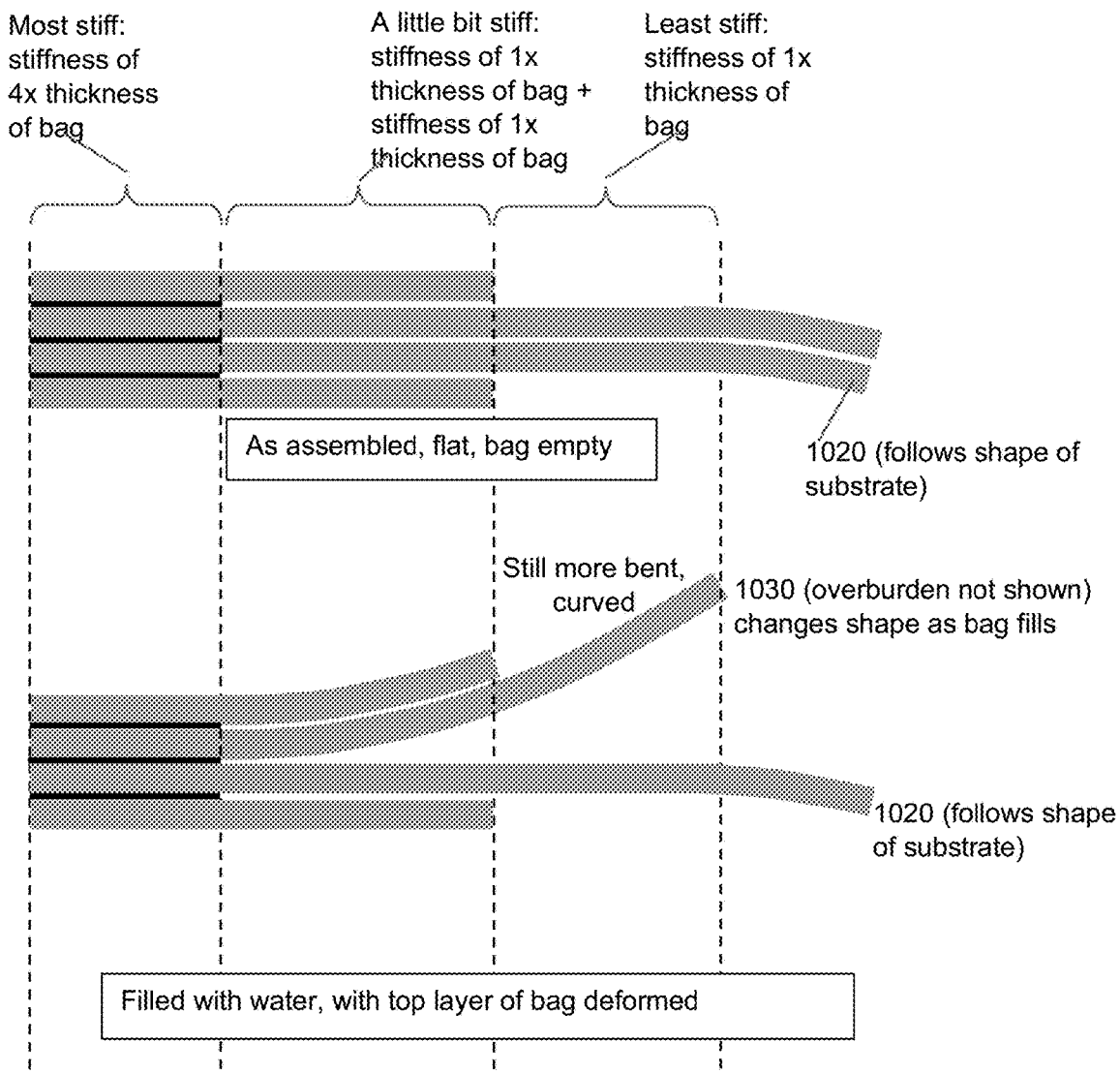
Figure 8D:
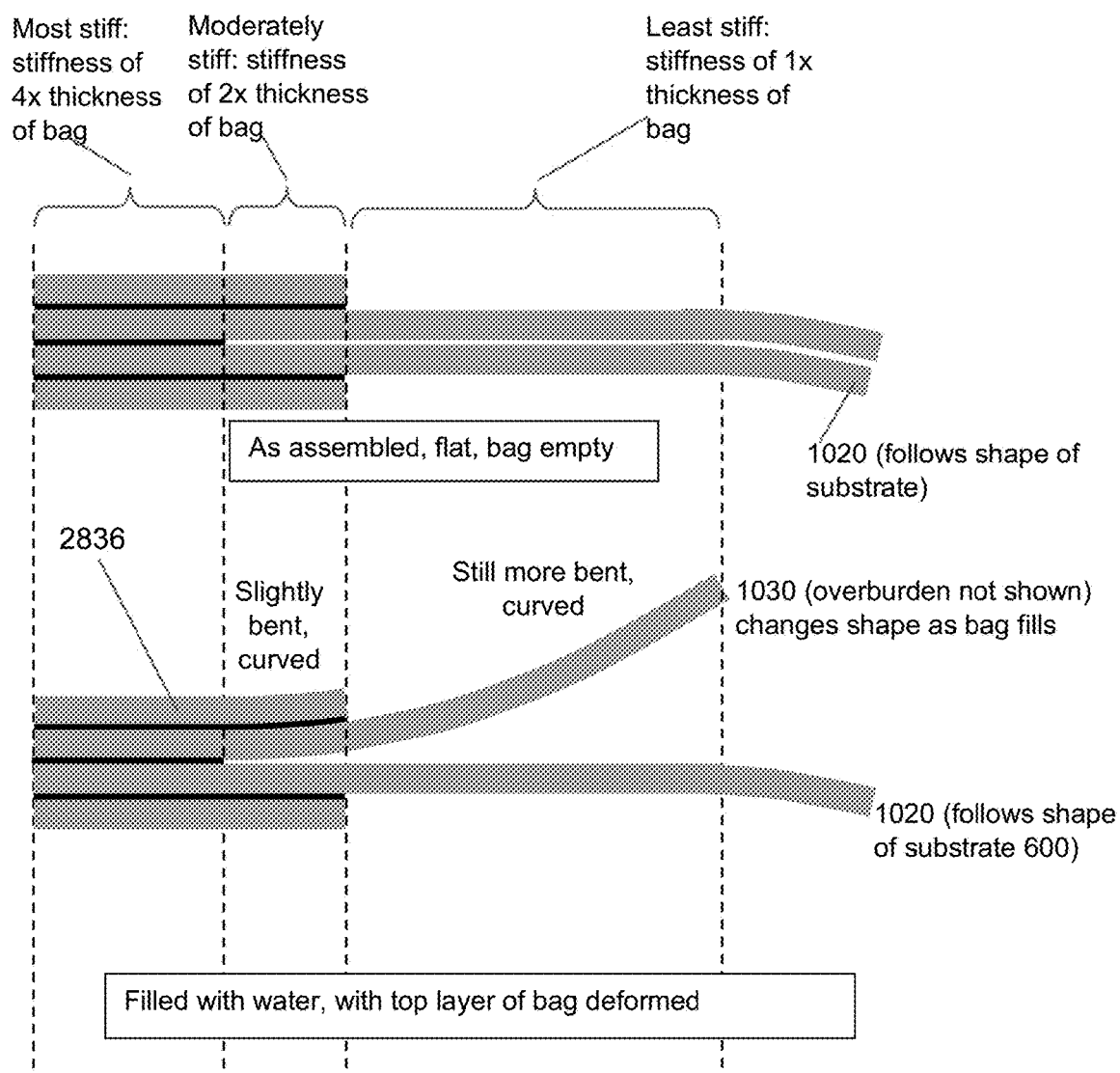
Figure 8E:
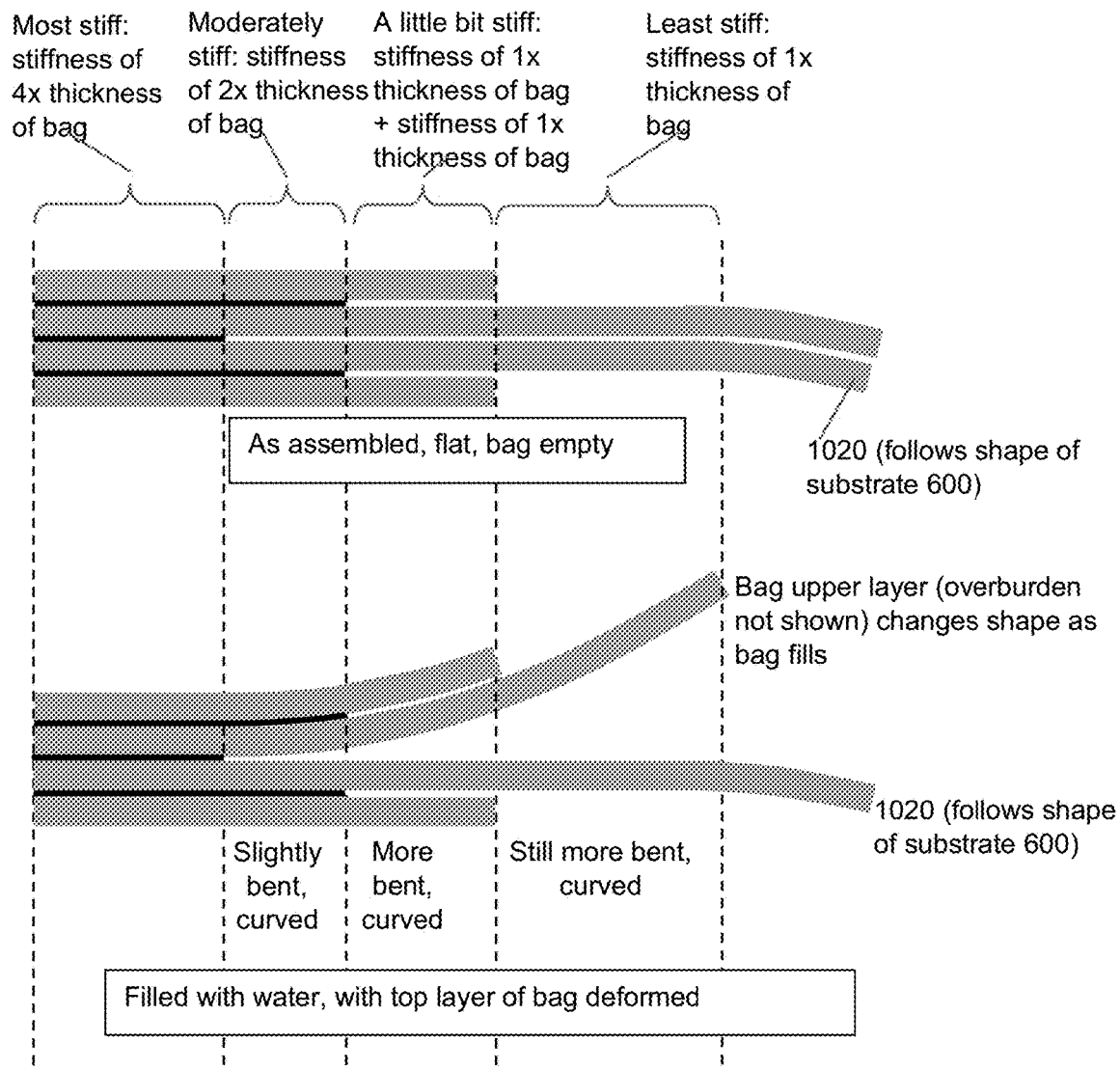

FIG. 8A shows a lap joint. FIG. 8B shows a face-to-face edge joint in situation of empty and at least partially full. FIG. 8C shows a face-to-face edge joint having a supplemental layer that extends inward of the main joint and is unbonded to the bag upper layer inward of the main joint. FIG. 8D shows a face-to-face edge joint having a supplemental layer that extends inward of the main joint and is bonded to the bag upper layer for the full dimension of the supplemental layer. FIG. 8E shows a face-to-face edge joint having a supplemental layer that extends inward of the main joint and is bonded to the bag upper layer some of the distance inward of the main joint and then extends further inward unbonded to the bag upper layer.

Figure 9A:
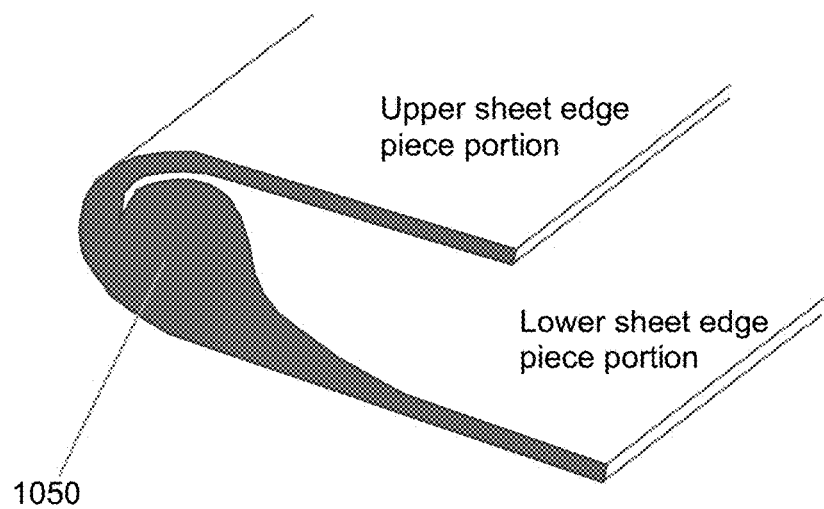
Figure 9B:
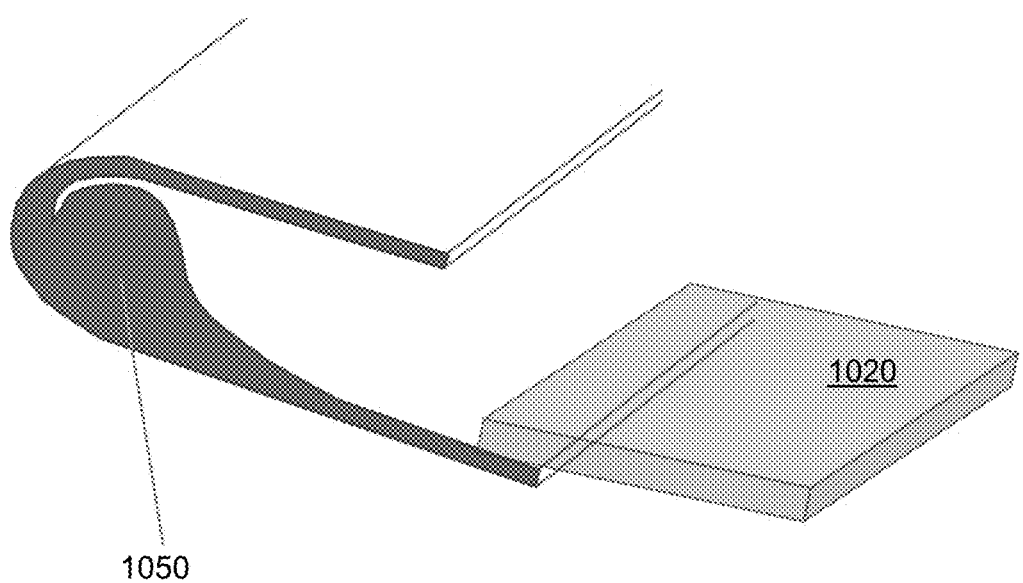
Figure 9C:
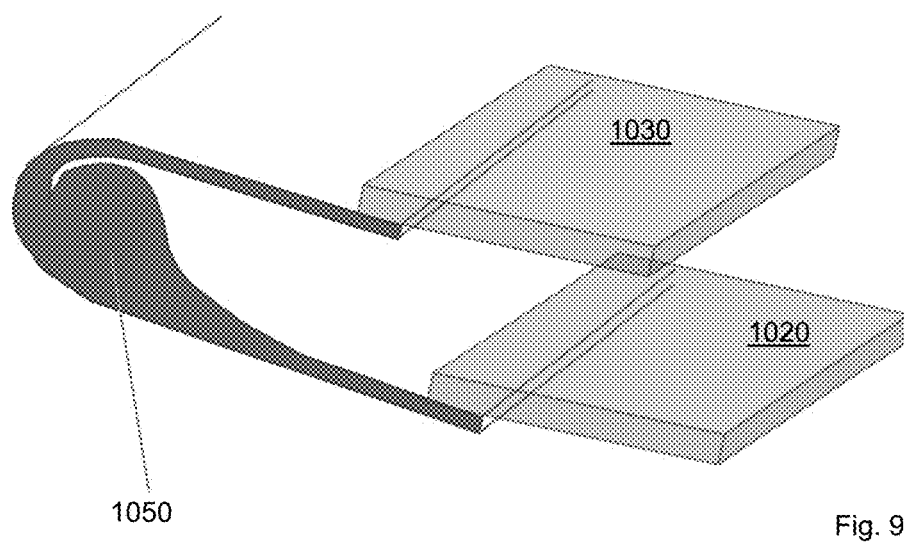
Figure 9D:
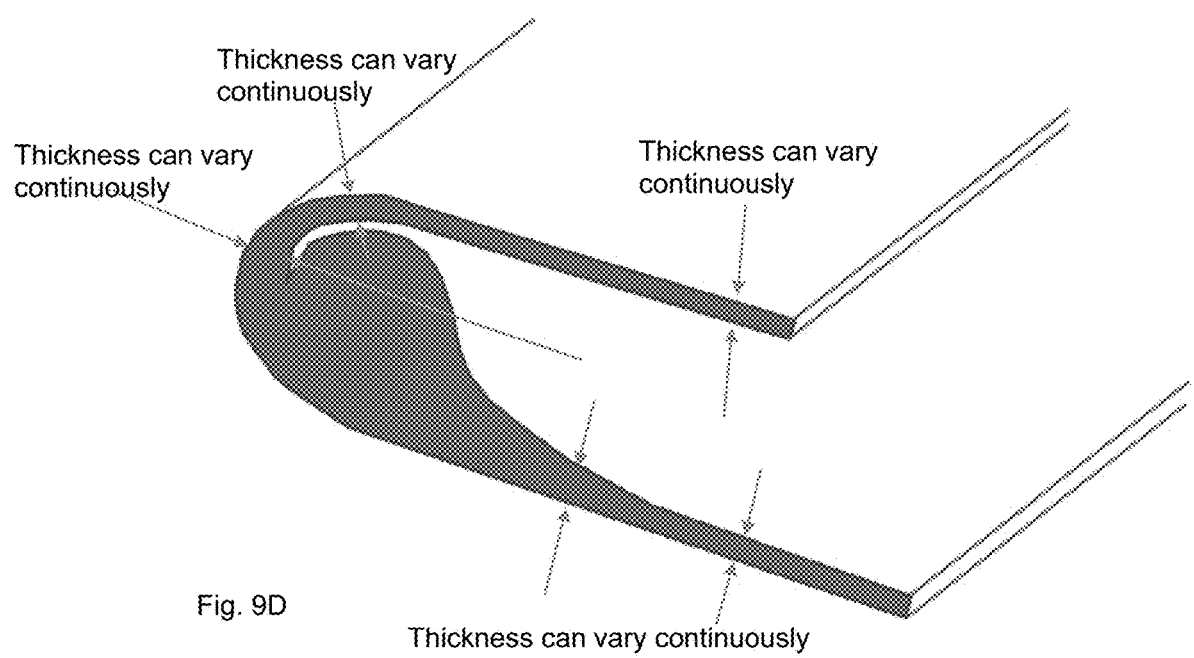

FIG. 9A shows an edge piece for use in forming an edge of the bag. FIG. 9B shows the same in combination with a bag lower layer. FIG. 9C shows the same in combination with a bag lower layer and a bag upper layer. FIG. 9D shows the same illustrating continuous variation of thickness.

Figure 10E:
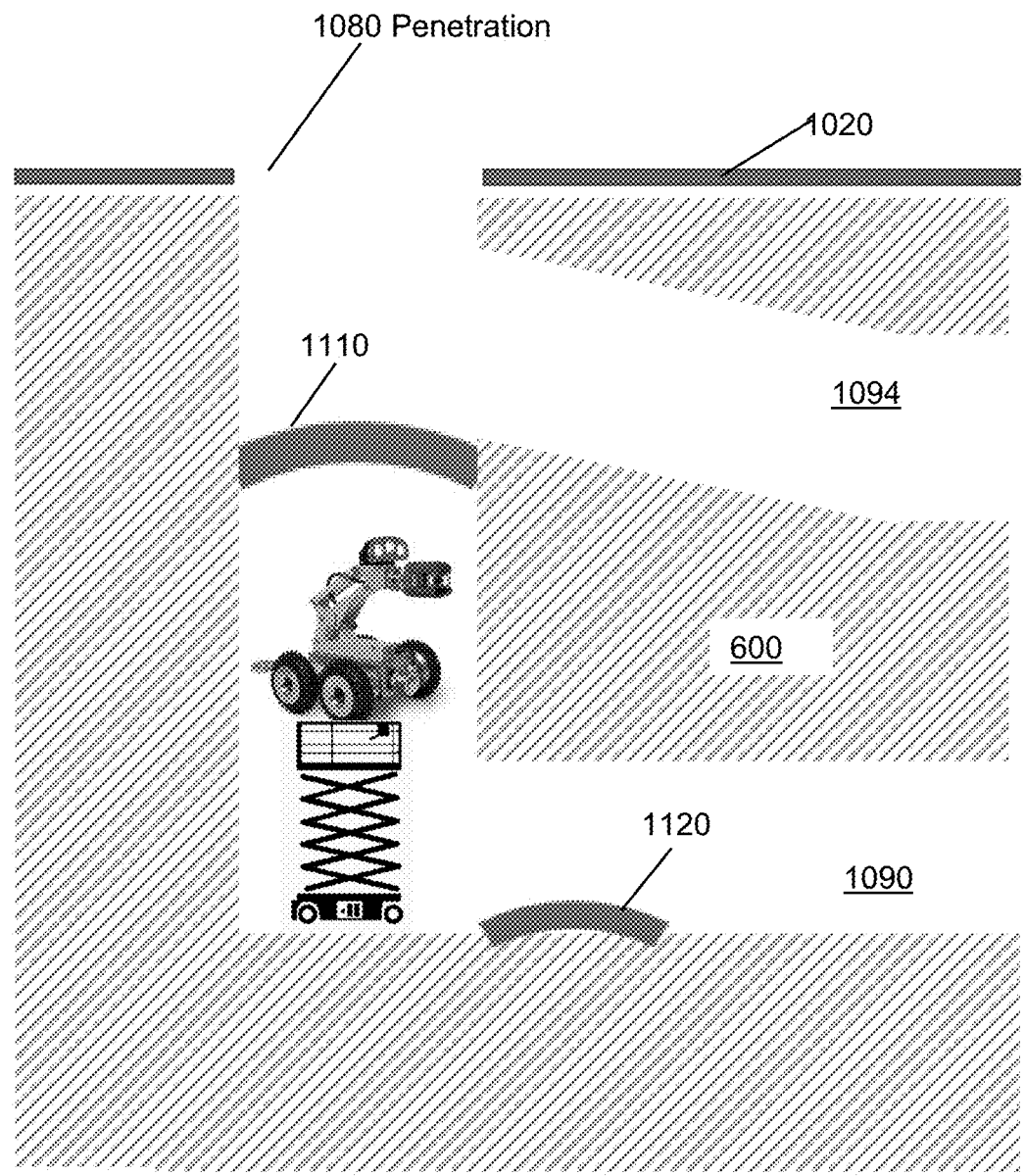
Figure 10F:
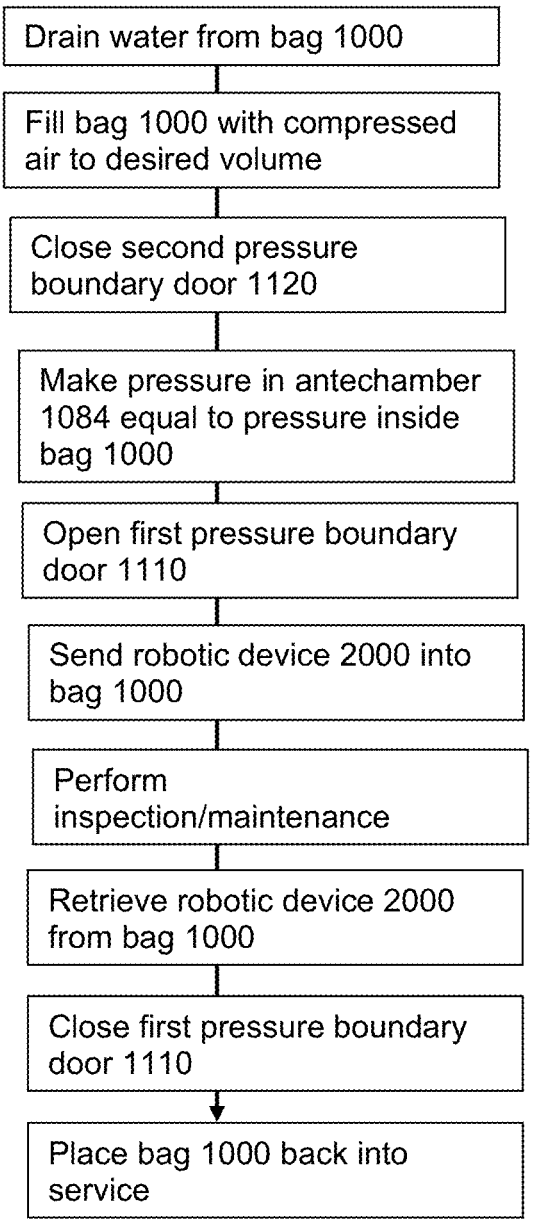

FIG. 10A shows an inspection/maintenance robot in an antechamber. FIG. 10B shows a close-up of a portion of FIG. 10A, with the second pressure boundary door being open. FIG. 10C shows the same, with both the first and second pressure boundary doors being closed. FIG. 10D shows the same, with the first pressure boundary door being open and the inspection/maintenance robot being lifted up to the level of the bag interior. FIG. 10E shows an antechamber and a conduit sharing a common penetration through the bag lower layer. FIG. 10F is a flowchart showing a sequence of steps for inspection/maintenance.

Figure 11:
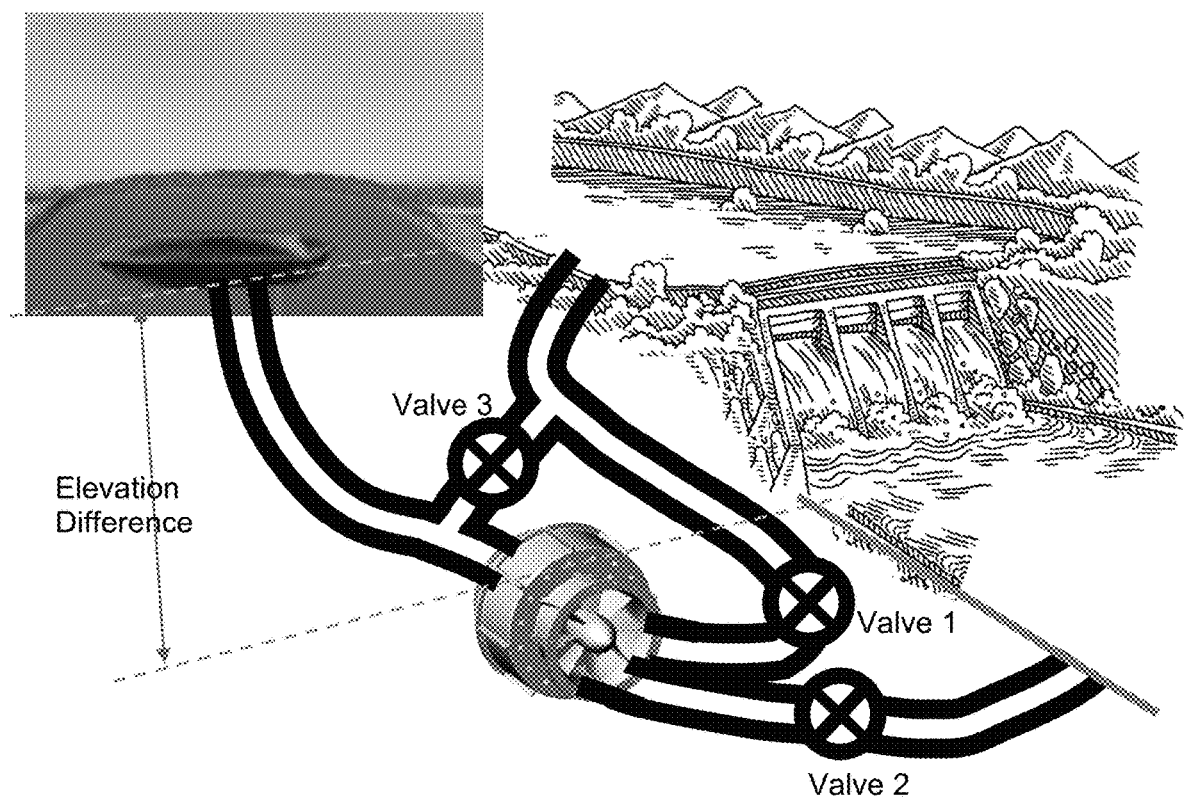

FIG. 11 shows a UPHS installation in conjunction with a dam on a river.

DETAILED DESCRIPTION OF THE INVENTION

Figure 1A:
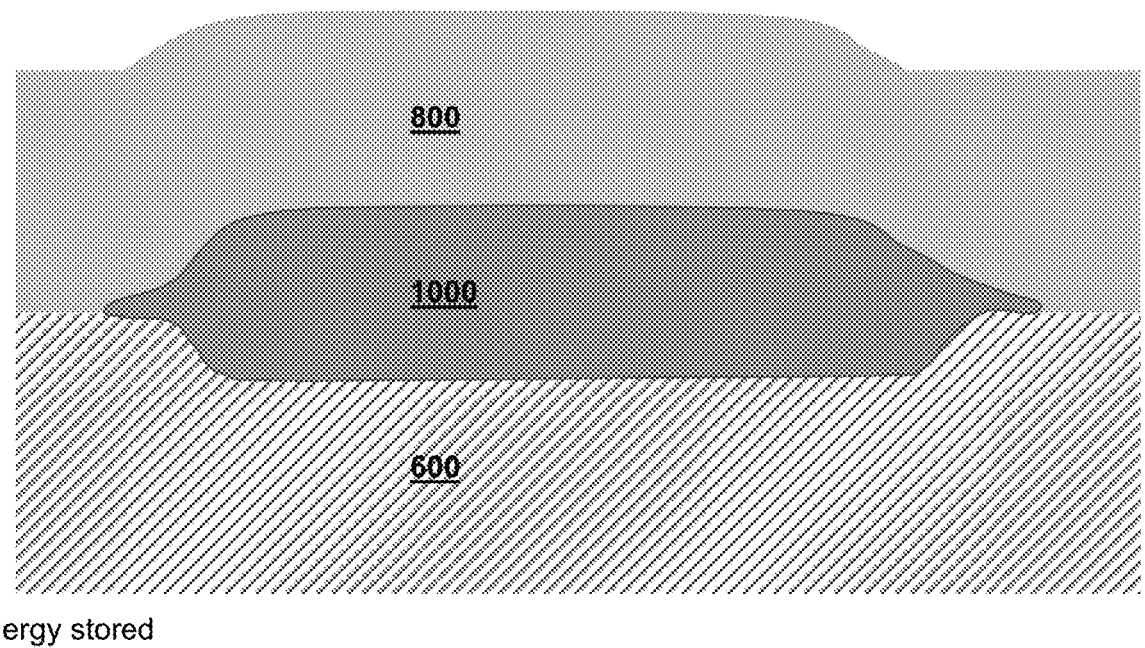
Figure 1B:
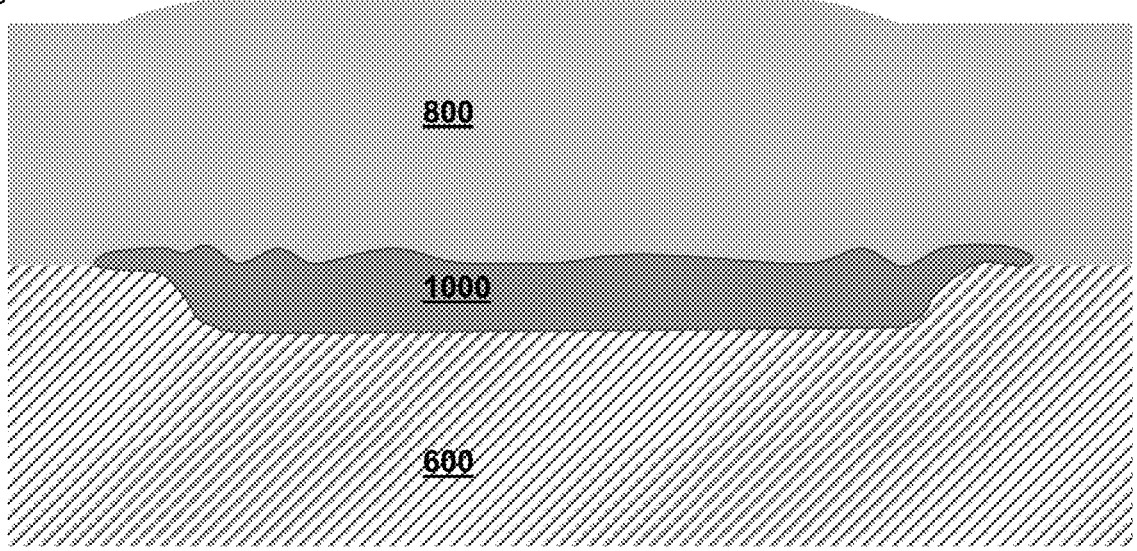
Figure 1C:
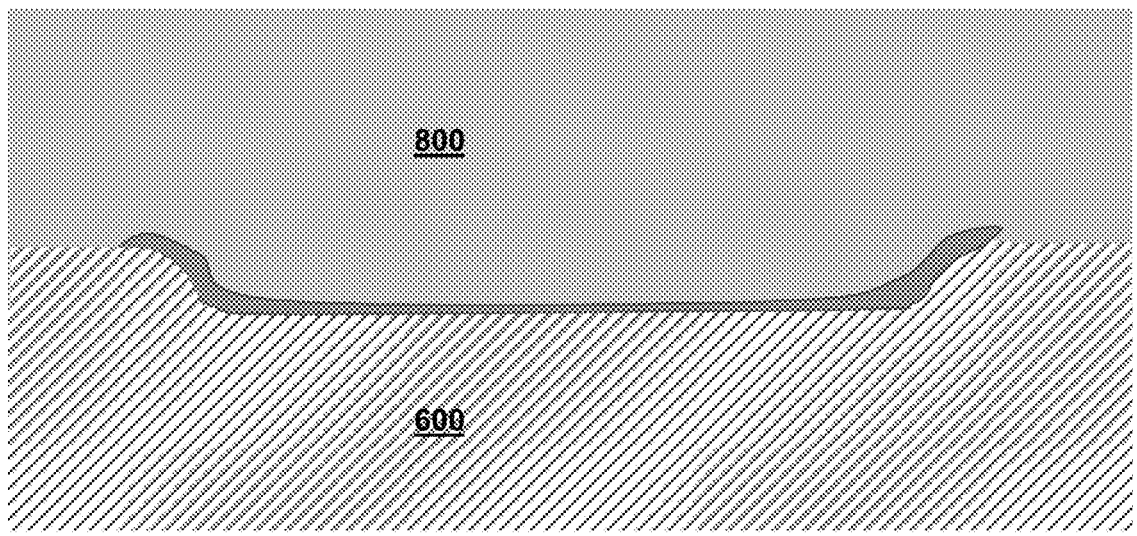

In an embodiment of the invention, referring now to FIGS. 1A through 1C, there may be provided a system that comprises a substrate 600 upon which rests a large, flexible, deformable, expandable bag 1000 that has an overburden 800 placed on top of it. The bag 1000 may comprise a bag lower layer 1020 and a bag upper layer 1030, which may be joined to each other or be structurally continuous with each other at an edge of bag 1000. The bag 1000 may extend in a generally horizontal direction and may be able to expand in at least a vertical direction as a function of the degree of filling of the bag 1000. The bag 1000 may be covered by overburden 800, which may be soil or earth, which may create or increase pressure in the liquid inside the bag 1000. Energy can be stored in the form of the potential energy caused by raising the mass of the overburden 800 when the bag 1000 is filled such as with water. Energy can be recovered when the overburden 800 is lowered and water flows out of the bag 1000. Filling and emptying of the bag 1000 may be accomplished by the flowing of a liquid such as water into or out of the bag 1000, through a pump/turbine or similar device. Energy storage may be accomplished using a pump, and energy recovery may be accomplished using a turbine-generator. The soil has a density greater than the density of water. The soil may optionally be piled to an elevation greater than the elevation of surrounding terrain. UPHS has the potential to make pumped hydro technology more widely applicable even for sites that do not naturally have mountainous terrain.

In an embodiment of the invention, substrate 600, located underneath the bag lower layer 1020, may define the shape of the bag lower layer 1020 at any of various stages of filling or discharge, and may help to define the shape of the bag 1000 when the bag 1000 is empty. This is illustrated in FIG. 1A for a condition where the bag 1000 is full, and in FIG. 1B for a condition where the bag 1000 is approximately half full, and in FIG. 1C for a condition where the bag 1000 is nearly empty.

As illustrated, in FIGS. 1A-1C, the substrate 600 may have a central region that is generally flat. The edge regions of the substrate 600 may extend higher, forming an overall dish sort of shape for the substrate 600. In the embodiment illustrated in FIGS. 1A-1C, the substrate 600 upon which the bag 1000 (more specifically the bag lower layer 1020) rests has a shape that, in its central region, has a concavity or a dish shape. The bag lower layer 1020 may substantially rest upon and conform to the substrate 600. The bag upper layer 1030 may change shape with changing between the full configuration of the bag 1000 and the empty configuration of the bag 1000. In the empty configuration, the bag upper layer 1030 may have a concavity when viewed from above. In the full configuration, the bag upper layer 1030 may have a convex shape when viewed from above. This is a more qualitative change of geometry or shape of the bag upper layer 1030, as compared to simply stretching the bag upper layer while the bag upper layer always maintains approximately the same shape as was described in the Olsen journal article. In what is illustrated In FIGS. 1A-1C, in the empty configuration of the bag 1000, the bag upper layer 1030 is concave (dished downward) when viewed from above, and in the full configuration of the bag 1000, the bag upper layer 1030 is convex (curved upward) when viewed from above.

In the process of the bag 1000 changing between empty and full, there is some bending of the bag upper layer 1030 associated with the change of shape. In the course of the bag 1000 changing between empty and full, there can be a change in sign of the slope of some portions of the bag upper layer 1030. The central regions of the bag upper layer 1030 tend to be somewhat flat, although perhaps not perfectly flat, in both empty and full configurations. In FIGS. 1A-1C, the edge of the bag 1000, where the bag upper layer 1030 and the bag lower layer 1020 are joined, is illustrated as being able to flex, i.e., change its included angle as a function of degree of filling of the bag 1000.

When the bag 1000 is fully filled, the bag upper layer 1030 may be stretched to assume a shape that is convex when viewed from above. This shape has a certain perimeter or arclength. When the bag 1000 is nearly empty, the bag upper layer 1030 is stretched in to assume a shape that is concave when viewed from above, generally corresponding to the shape of the substrate 600, and may be similar to the shape of the upper layer 1030 of the nearly-full bag 1000. When the bag 1000 is approximately halfway full, the bag upper layer 1030 will extend generally horizontally the distance from one bag edge joint 1040 to the bag edge joint 1040 at the opposite side of the bag 1000. This edge-to-edge distance is less that the just-referred-to perimeter or arc-length of bag upper layer 1030. More quantitatively, the perimeter or arclength of the bag upper layer 1030 may be larger the edge-to-edge distance by approximately 10% or possibly even as much as 20%. The exact number depends on how deeply dished the substrate 600 is and on the designed ratio of lift distance to edge-to-edge distance. In FIG. 1B, the shape of the bag upper layer 1030 is shown as wavy because the detailed shape of bag upper layer 1030 may be somewhat indeterminate, at least given the assumptions under discussion so far. It can be furthermore understood that, if it is necessary for the bag upper layer 1030 may become "wrinkled" by ~10% or more and then become straight or stretched again during the course of a filling/emptying cycle, then the overburden 800 that is touching or nearly touching the bag upper layer 1030 may have to undergo a similar change of its local horizontal dimension. It can be expected that some rearrangement or flow of the overburden 800 material is necessary during this cycle, especially at the soil near the bag upper layer 1030, but even to a lesser extent higher up in the overburden 800. In FIG. 2B, the waviness of the bag upper layer 1030 is shown as being somewhat greater near the edges of bag 1000, and somewhat less in the central region of bag 1000. This is because it is believed that a greater degree of rearrangement of bag upper layer 1030 and of the local overburden 800 will occur near the edges of the bag 1000, compared to at the central region of the bag 1000. This is believed to occur because the extent of change of shape of the bag upper layer 1030, during the course of a filling-emptying cycle, is greater near the edges of the bag 1000, compared to at the central region of the bag 1000.

As illustrated herein, at bag-empty conditions the top surface of the overburden 800 is illustrated as being flat, and at bag-full conditions the top surface of the overburden 800 is illustrated as being upwardly bulged. At the intermediate condition, the top surface of the overburden 800 is illustrated as being somewhat upwardly bulged, but not as much as for the bag-full condition. It can be understood that variations of these situations are possible.

Figure 1D:
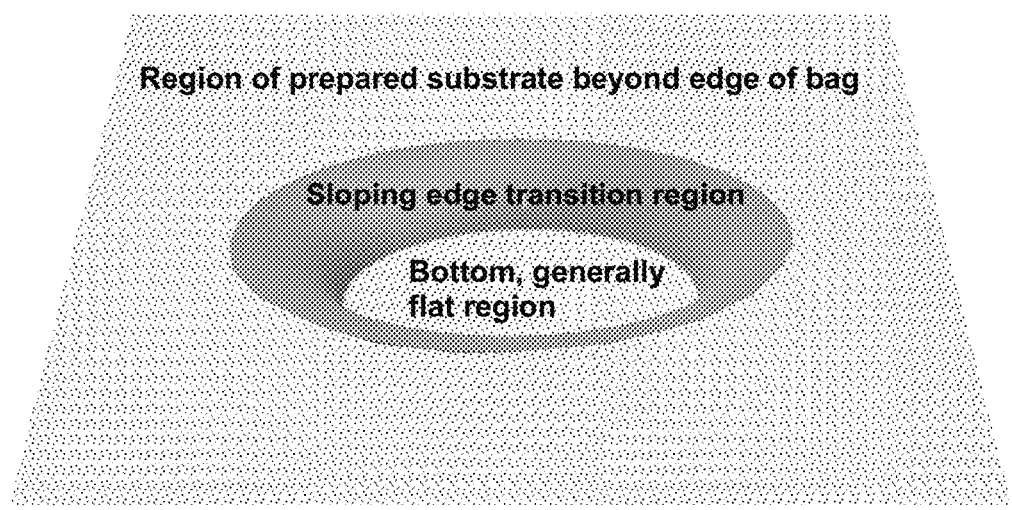

FIG. 1D is an illustration of a shaped substrate 600 onto which a bag 1000 could be placed in order to achieve geometric characteristics as discussed in connection with FIGS. 1A-1C. This substrate shape is illustrated for an overall bag and substrate configuration that is axisymmetric, i.e., has an axis of symmetry that is a vertical axis. In FIG. 1D, for clarity of illustration, no bag is present in the illustration; only the substrate 600 is illustrated. In FIG. 1D, the interior that is labeled bottom, can be a generally flat region configured to be generally flat for the bag 1000 to rest on, corresponding to the central region of the bag 1000 in FIGS. 1A-1C. Further out from the center there is illustrated a transitional region of the substrate 600, which provides some slope or curvature to that portion of the bag 1000 that is supported thereby. The outermost edge of the bag 1000 could be located at approximately the outer edge of the transition region. Alternatively, the outermost edge of the bag 1000 could be located slightly further out.

Of course, an axisymmetric bag shape as illustrated in FIG. 1D is one possible bag shape, but is not the only possible bag shape. For example, in plan view, the bag 1000 could be a rounded-rectangle, elongated in one direction, or could be any of various other shapes.

Spatial Nonuniformity of Overburden Composition or Properties

In embodiments of the invention, it is possible to provide overburden 800 that might have physical properties or composition that are spatially non-uniform. Within the overburden 800, not all local regions of the overburden 800 might need to have identical composition or properties or compositional requirements.

In more detail, again referring back to what was illustrated and discussed in FIGS. 1A-1C, in certain embodiments of the invention, the bag 1000 may have certain regions that undergo especially large change of their shape or curvature upon transition between the "filled" and the "empty" configurations of the bag 1000. For example, such regions that undergo significant change of shape or curvature are believed to be located near the outer edge of the bag 1000. Over the course of a filling/emptying cycle, such regions may change their local shape from concave to convex or vice versa. Other regions of the bag 1000 that are more centrally located might undergo less of such change of shape or curvature, i.e., might remain closer to being flat during the transition between filled and empty. During filling or emptying of the bag 1000, when the bag 1000 transitions between shapes, the local overburden 800 (sand, soil, gravel, etc.) may undergo some amount of deformation at or near the bag 1000 especially where the bag 1000 locally undergoes significant change of shape or slope. It is possible that such deformation of the overburden 800 could result in particles of the overburden 800 sliding against the surface of the bag upper layer 1030, which could potentially abrade that surface of bag upper layer 1030. First of all, the bag upper layer 1030, at least in that region, may be designed to have inherent physical properties of being appropriately abrasion-resistant or tough.

Figure 2A:
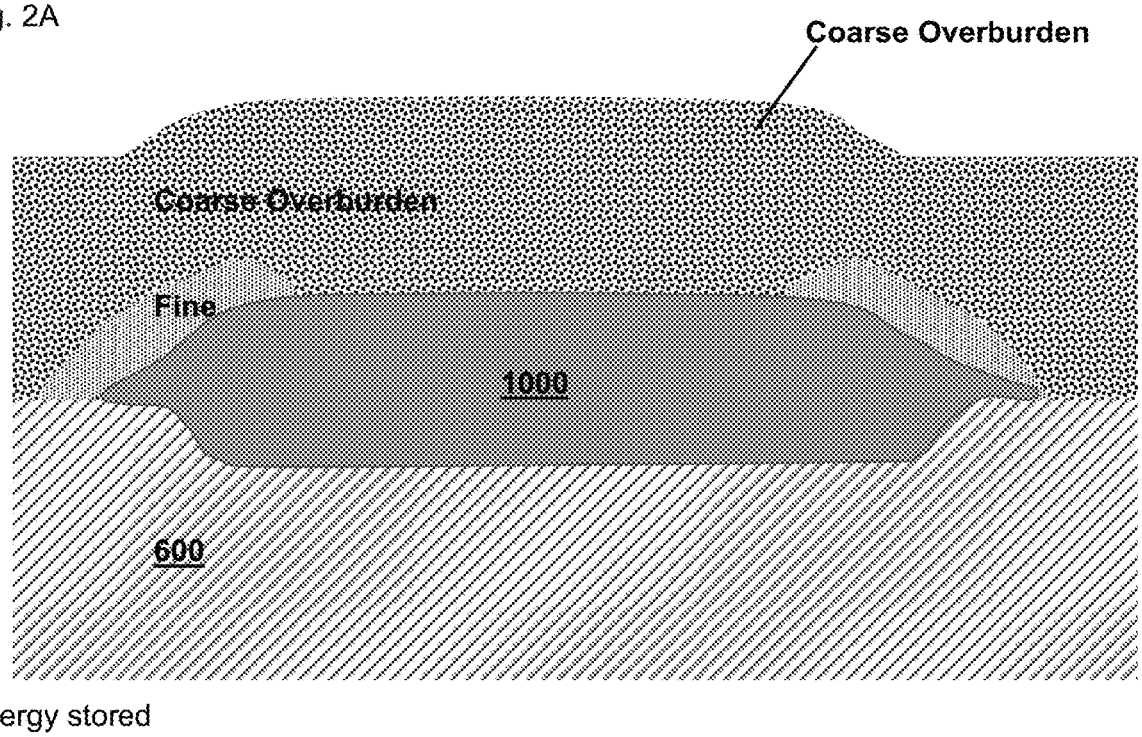
Figure 2B:
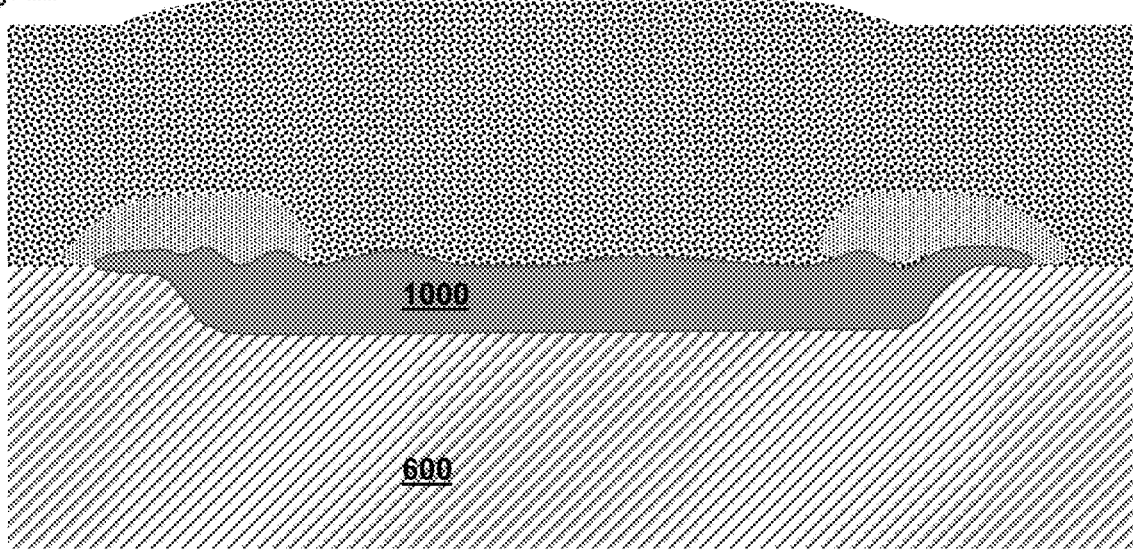
Figure 2C:
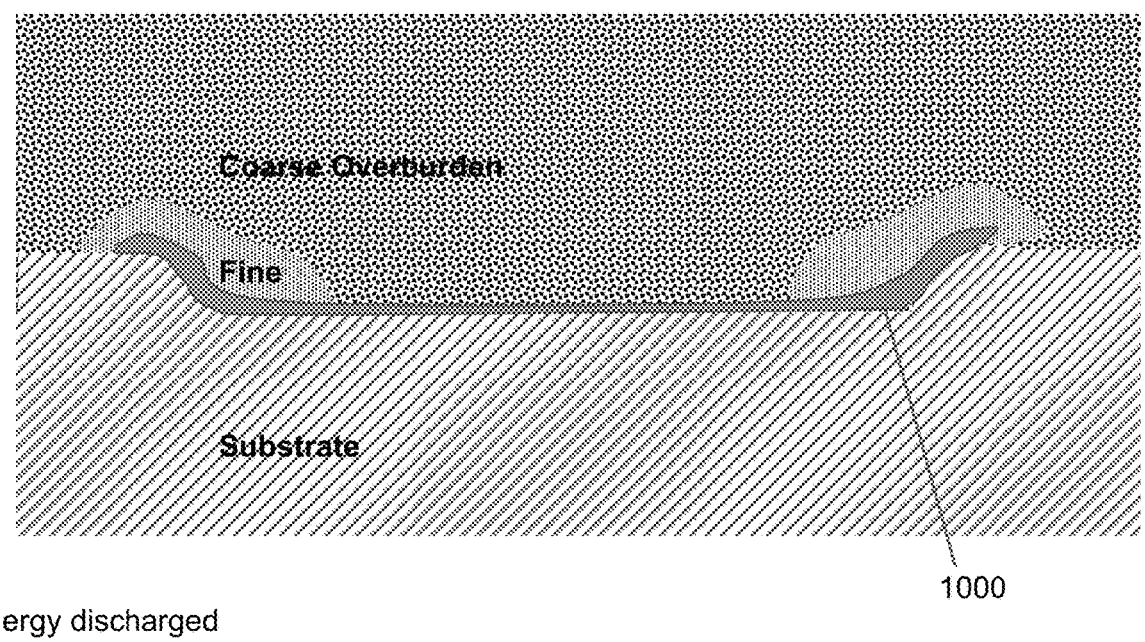

Referring now to FIGS. 2A-2C, in recognition of where the overburden 800 that is touching or nearly touching the bag 1000 undergoes significant deformation during cycling, the composition of the overburden 800 may be chosen to vary in the horizontal direction. Near the outer edges of the bag 1000, where there is expected to be a relatively large amount of change in the slope of the bag upper layer 1030 and a relatively large amount of local deformation of the overburden 800 during a filling/emptying cycle, the overburden 800 that is in contact with the bag 1000 or close to the bag 1000 may be chosen to be more gentle to the bag in the sense of being free of rocks or sharp components, which could be accomplished by screening or sieving the overburden material. Similarly, the overburden 800 that is in contact with the bag 1000 or close to the bag 1000 could comprise sand, or even comprise a material that is more fine-grained than sand, etc. Toward the central region of the bag 1000, where there is expected to be a relatively smaller amount of change in the slope or shape of the bag upper layer 1030 and a relatively smaller amount of local deformation or flow of the overburden 800 during a filling/emptying cycle, it might not be so necessary that the overburden 800 be chosen for its "gentleness" properties. In such a region, there might be less concern about the overburden composition, and such overburden 800 could even be native soil.

As examples of further detail, such variation could comprise presence of sand in contact with the bag at an outer 20% of a width of the bag, and no presence of sand or less presence of sand in a center-most region of the bag that is a center-most 20% of a width of the bag. It is possible that overburden in contact with the bag at an outer 20% of a width of the bag could have been sieved or screened to remove sharp objects or objects larger than a specified size. Such variation could comprise overburden in contact with the bag at an outer 20% of a width of the bag having a smaller average particle size than overburden in contact with the bag at a center-most region of the bag that is a center-most 20% of a width of the bag.

These comments apply to the overburden 800 that is in the lower part of the overburden 800, closer to the bag 1000. For overburden that is closer to the top of the overburden 800, such considerations might be less important. For example, it might be estimated that the upper three-quarters of the overburden 800 might not have to be selected for its "gentleness" properties.

It furthermore is possible that the substrate material just underlying the bag 1000 could be sand, or could be screened or sieved to remove sharp objects or rocks, or otherwise could be selected for its "gentleness" properties.

Wetness Properties of the Overburden, and Irrigation Hose

It can be understood that, in embodiments of the invention, the flowability or rheological properties of the overburden 800 can influence the performance of the system. As described elsewhere herein, over the course of a filling/emptying cycle, the shape of the upper surface of the bag may undergo significant changes of the shape including change of concavity/convexity. Over the course of a filling/emptying cycle, there is likely to be some local stretching or contracting of the overburden 800 that is located near the bag upper layer 1030. Therefore, flowability properties of the overburden 800 may be especially useful close to the upper surface of the bag 1000.

In general, the flowability or rheological properties of the overburden 800 can be influenced by both the local composition of the overburden 800 and its wetness. It can be expected that sand tends to be more flowable than other overburden 800 compositions. In general, overburden 800 that is wet resembling mud can be expected to flow more easily, and conform more easily to the shape of the bag 1000, than overburden 800 that is dry. For example, an overburden 800 that is so wet as to be at or near a condition that would be described as mud would be more flowable than the same composition that is dry.

Here, it is appropriate to consider what possible different properties might be available from various soils. It is possible to use different properties, especially deformation or flowability properties, of different soils to advantage. In embodiments of the invention, the overburden 800 could be constructed with different soils or soil properties in different places within the overburden 800. First, it seems that in general, sand is more easily deformable than ordinary soil. This may relate to sand particles being generally larger than the particles in soil. Also, in embodiments, sand having high wetness would be even more easily deformable, and similarly, mud (ordinary soil that is very wet) should be easily deformable. With mud, there could be a yield stress that would need to be overcome to start motion, but after that it is overcome, the mud should be able to deform somewhat easily. So, ensuring wetness in a desired region could be useful especially if wetness could be maintained somewhat permanently.

It can also be noted that the overburden 800 that is wet (and more fluid) than other overburden 800 will likely be more dense than the corresponding dry overburden 800 made of the same overburden material. So, given that the wet region would usually be located below the dry region, the wet region would tend to stay where it is located.

The wet region could be mostly above or near the outer edge of the bag 1000 (such as the outermost 25% of the overall width of the bag), because it is believed that that is where most of the local flow and deformation of the overburden 800 occurs, as discussed elsewhere herein.

Figure 3A:
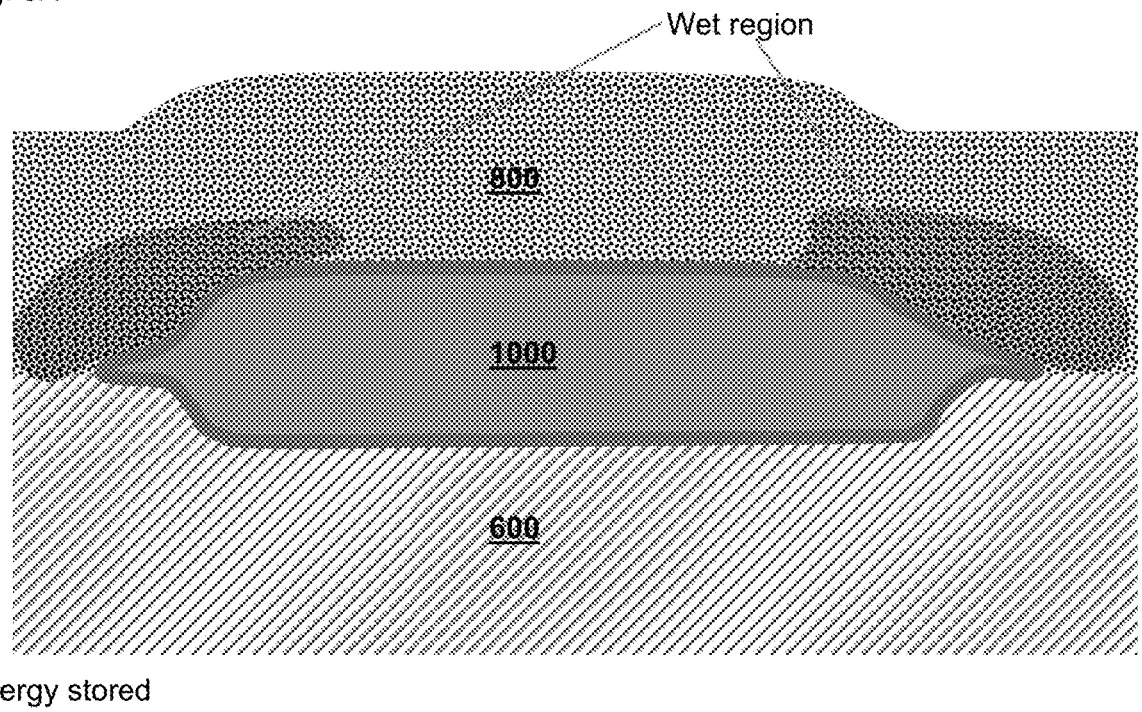
Figure 3B:
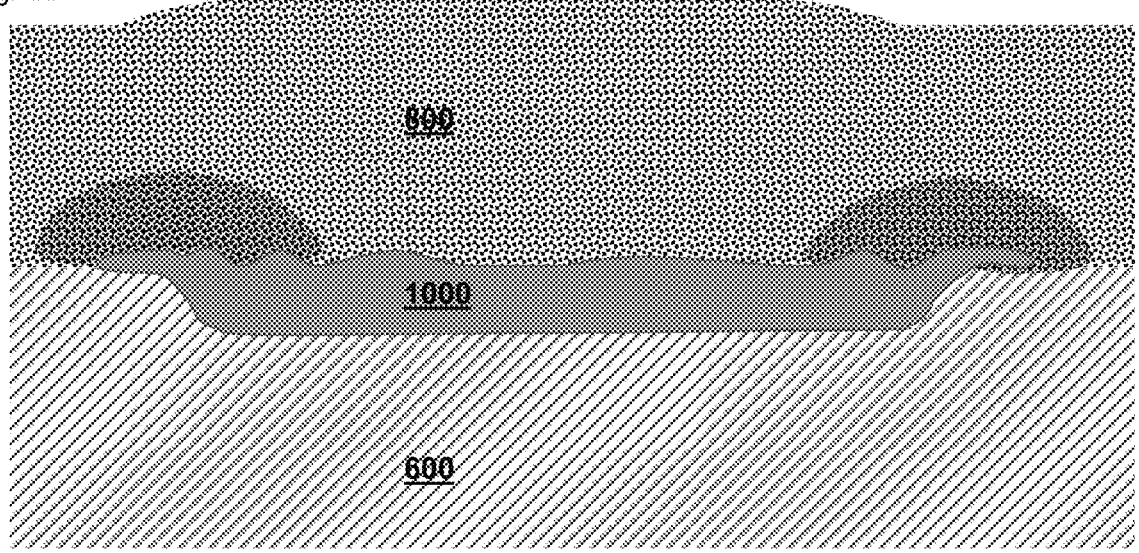

As illustrated in FIGS. 3A-3C, it is possible to deliberately cause certain regions of the overburden 800 to be wetter than other regions of the overburden 800. Such wet region may be just above the bag upper layer 1030, while portions of the overburden 800 near the atmospheric-facing surface of the overburden 800 could be drier. Such relatively wet region may be in the vicinity the outer edge of the bag 1000, rather than at the central region of the bag 1000. It can be expected that over the course of a filling/emptying cycle, near the outer edges of the bag 1000 there may be a larger amount of local change of shape of the bag 1000 and deformation of the overburden 800, compared to the amount of change of shape that occurs near the center of the bag 1000. It is believed that, for parameter ranges of practical interest, the central region of the bag 1000 (such as the middle 50%) remains somewhat flat over the course of a filling/emptying cycle, depending of course on geometric details.

Irrigation System in Overburden

Still further, as illustrated in FIG. 3D, in an embodiment it is possible to bury an irrigation system in the overburden 800 near the desired region of flowability. Release of water could create wet soil or mud that is easily deformable. In fact, release of water into sand or soil from below could even create quicksand, which is sometimes believed to be associated with upward flow of water in a porous medium.

In an embodiment of the invention, this wetness can be accomplished by burying an irrigation hose(s) 2100 in the overburden 800 at appropriate places. Referring now to FIG. 3D, in an embodiment of the invention, the overburden 800 could be deposited such as to contain irrigation hoses 2100 buried in the overburden 800 near but slightly above the bag 1000 or in specific high-motion regions of overburden 800. The buried irrigation hose 2100 may have perforated walls or porous walls as desired, or may deliver liquid out through the end of the hose, or both. For example, the irrigation hose 2100 may be such that liquid may be delivered through the irrigation hose 2100 to the overburden 800 so as to make the overburden 800 more wet and flowable in desired places. Such irrigation points could be provided in places where a relatively large amount of overburden deformation is expected during a filling/emptying cycle.

If desired, such irrigation points could also be provided in places where less overburden deformation is expected during a filling/emptying cycle, although such provision is believed to be less important. In embodiments of the invention, the plumbing supplying the plurality of irrigation hoses 2100 may comprise valves or controls so as to allow provision of irrigation liquid to whichever irrigation hoses 2100 are desired to provide irrigation, at the discretion of the operator. Irrigation points could be omitted at locations that, in plan view, are substantially outside the region of the bag 1000.

In embodiments of the invention, the irrigation hose 2100 may be laid down within the overburden 800 in a wavy or sinuous layout, so as to avoid stretching or breakage of irrigation hose 2100 during motion or deformation or change of shape of the overburden 800. Irrigation hoses 2100 may be laid out in respective paths that are mostly circumferential resembling the shape of the circumference of the bag 1000 moreso than radial or generally traversing from exterior of the bag 1000 toward the central region of the bag 1000. In general, the path of the irrigation hose 2100 can have a larger circumferential component than radial component. It is still further possible that if the path of the irrigation hose 2100 is sinuous on a large scale, the hose 2100 itself could further have some additional waviness on a smaller scale. Any waviness on any size scale is believed to make the irrigation hose 2100 better able to accommodate or follow motions and deformations within the overburden 800 without breaking.

Installation of such an irrigation system could done be in combination with laying down overburden 800 of a desired composition (for example, sand, or ordinary soil obtained locally, or other bulk material) or of a desired particle size in a particular location, for purposes of influencing the local characteristics of motion or rheological characteristics of the overburden 800. For example, a more-highly-irrigated region of the overburden 800 could also be a region that has a desired composition, such as sand or fine-particle soil, compared to other regions of the overburden 800.

In embodiments, it is possible that a fine-grained region of the overburden 800 could be provided such as is illustrated in FIGS. 2A-2C, and a wet region of the overburden could be provided such as is illustrated in FIGS. 3A-3C. Those regions could be identical with each other, or could be different from each other, and they could overlap with each other.

It is also possible that the wet region could be larger than shown, such that a substantial portion or even the entirety of the overburden 800 could be irrigated or wet.

Compliance Zone

Referring now to FIGS. 4A-4B, in regard to maintaining an ongoing state of wetness in the compliance zone, in embodiments of the invention, it is possible to provide an impermeable or low-permeability boundary that also does not suffer badly when deformation occurs at certain locations within the overburden 800 due to filling and emptying of the bag. It might be possible to do this without using sheets of geosynthetic plastic material to form the deformation region. Some clays have quite low permeability for the flow of water through them. Clays have very fine particles (in contrast to sand, which has larger particles). Permeability for liquids strongly decreases with decreasing particle size of a porous medium or aggregate.

FIGS. 4A-4B show a design that has several different soil compositions appropriately placed within the overburden 800. On the outside of the installation, there is shown ordinary (native) soil. This might be the simplest of all of the described zones, namely undisturbed soil, although that would depend on construction details.

Above the central region of the bag there is shown an overburden 800 of ordinary (native) soil. This portion of the overburden 800 could be disturbed native soil, as a result of earthmoving operations to create the overburden 800 above the bag 1000.

Near the perimeter of the bag is shown a region, which might be called a compliance region, that could be a granular material such as sand, or could be some material that is wet, or could be both. It can be seen that this region changes its shape as the overburden 800 shifts between the two configurations (energy storage, energy discharge). The shape change is why compliance properties may be desirable for that region.

In another embodiment of the invention, it is possible to make the entire overburden 800 above the bag relatively flowable, while at the same time soil outside the region of the bag 1000 may be of a less-flowable nature. For example, if sand is considered to be more flowable than ordinary soil, it is possible that the overburden 800 directly above the bag may be sand, while the bag region is surrounded on its exterior edges by ordinary soil that is less flowable. This may cause the entire overburden 800 to move up and down as a semi-liquid piston whose shape is somewhat defined by, or that is contained by, the surrounding less-flowable ordinary soil.

As discussed, having the compliance region be wet probably would help it to be softer and more easily compliant. Because of the wetness being considered in this embodiment, there are shown two dark layers that represent low-permeability layers. The low-permeability layer should allow little or no passage of water through it, thereby maintaining the compliance zone as wet and easily deformable, so that there is little or no need to add water to keep the compliance zone wet. It is shown that one of these low-permeability layers goes underneath the bag and up to the surface of the bag lower layer 1020 along the native possibly undisturbed surrounding soil. This would keep the region of overburden 800 near the bag 1000 and in the compliance zone wet. The other low-permeability layer is above the bag 1000 and surrounding the movable mass of overburden 800. This should help to keep the movable mass of overburden 800 dry, which among other results helps the movable mass of overburden 800 to act like a solid and maintain its shape. (At a further level of detail, it still would be possible to provide some structure buried within the movable mass of overburden 800, to further help the movable mass of overburden 800 maintain its shape.)

Related to this, in an embodiment, if the bag lower layer 1020 and the compliance region are all surrounded by a low-permeability layer of earth to retain wetness and essentially make mud, it might not be necessary to have the upper low-permeability layer, or it might be possible to allow the entire movable mass above the bag 1000 to be wet. This would simplify the overall layout and construction by requiring fewer discrete soil regions. This would be possible, but it would have the disadvantage that the portion of the overburden 800 that is raised (directly above the central region of the bag 1000) might be wet enough and deformable enough that it could be difficult to prevent that material from flowing outward over the edges of the bag 1000 as the bag 1000 is filled and the overburden 800 is raised above its surroundings. Perhaps this tendency could be counteracted with some structure to keep the movable mass of overburden 800 above the bag 1000 in the shape that is desired.

In yet another embodiment, it is possible that if the movable mass of overburden 800 is always lower than the surrounding soil and never rises above the surrounding soil, maybe it would not be necessary to have structure within the overburden 800, and energy storage would simply amount to raising a mass of mud by filling the bag 1000 with water, instead of the described mode of raising a mass of dry soil by filling the bag 1000 with water. Presumably the region of surrounding soil, which remains dry by being outside the low-permeability boundary, would retain its shape anyway. So, this last variation would amount to simply filling/emptying a bag 1000 that is buried or submerged at the bottom of a fluid-like material, namely mud. In principle, it would have similarities to filling an underwater balloon with air for energy storage. However, in embodiments of the invention, the situation would be submerging a bag 1000 in higher-density mud fluid while filling the bag 1000 with ordinary water having a lower density than mud. In embodiments, this might make it desirable for the bag 1000 to be in some way anchored to the substrate 600, so that the bag 1000 would not float up. In this situation, storing energy would not be entirely a matter of lifting a solid mass but rather more like displacing a fluid. So, it might become less important what the actual shape of the bag 1000 is. The bag 1000 could, for example, be a series of cylinders or tubes that are placed in a somewhat side-by-side arrangement. In addition to having a modularity feature, this would help by allowing each tube to be individually anchored to the substrate 600.

Controlling Freeze-Up Properties of Upper Portion of Overburden

It may be considered that if a system of an embodiment of the invention is constructed or installed in cold climates, then during winter, it is possible that the top (atmosphere-facing) portion of the overburden 800 could freeze solid during extended periods of sub-freezing atmospheric temperatures. Such freeze-up could make the motion of the overburden 800 more difficult or more energy-consuming, which would be undesirable. Also, such freeze-up might cause the overburden 800, or some of the overburden 800, to "bridge over" and fail to descend when water is withdrawn from the bag 1000 during energy recovery. This might become especially problematic if there is snow or ice or water present at the exposed surface of the overburden 800 during such freezing conditions.

Figure 5A:
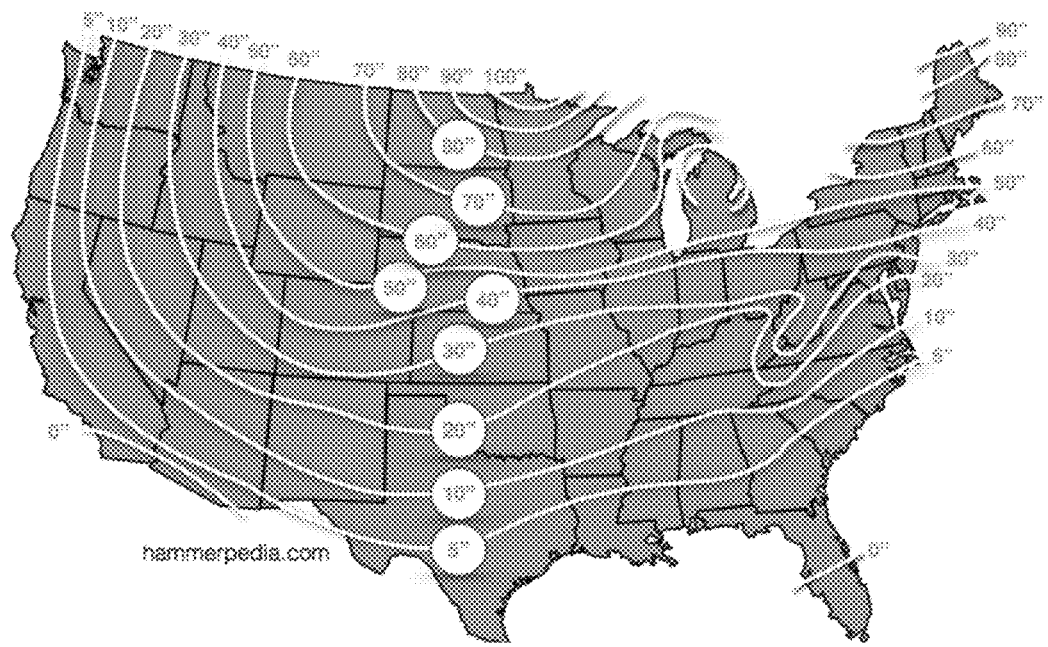
FIG. 5A shows a typical map of frost depth for the continental United States.

In general, if an initially warm mass of earth or soil is exposed to a cold environmental boundary condition, the cold temperatures may advance into the earth in the form of a traveling wave. When the earth or soil contains water and temperatures are such as to possibly cause freezing, local freezing of water or moisture in the earth or soil may occur, and at any given time during such a transient, there may be considered to be a location or depth in the earth that is the boundary between frozen earth and unfrozen earth. This boundary location may gradually advance into the earth as time progresses and cold weather continues. The freezing (phase change, solidification) phenomenon may be considered to be a wave or a front advancing into the earth on a seasonal timescale (and when temperatures become warmer, the front may recede). The presence and extent of such freeze-up is sometimes referred to as a frost depth and is discussed in construction codes, which for example specify that footers for structures are desirably buried in soil to a depth greater than the frost depth. The maximum frost depth is documented in available maps as a function of geographic location. In FIG. 5A, the indicated lines show the depth of penetration, into the soil, in inches, of frost during winter, as a function of geographic location in the United States.

Accordingly, in an embodiment of the invention, it may be provided that an uppermost layer or portion of the overburden 800 may comprise gravel or an aggregate of small rocks. This may reduce the freeze-up phenomenon. The gravel or aggregate in the upper layer may have heat capacity and heat conduction characteristics similar to those of ordinary soil, such that the progress, into the gravel or aggregate, of the wave of freeze-up may be similar to what occurs in normal soil. However, the gravel or aggregate may have properties of drainage such that rain etc. tend to drain fairly easily to lower (non-frozen) levels of the overburden 800. This would make the gravel/aggregate near the top of the overburden 800 less prone to freezing solid even in the presence of wet and cold weather by promoting drainage and reducing the number of possible freeze-up contact points between particles or elements of the gravel/aggregate. Also, if freeze-up does occur between adjacent particles of gravel/aggregate, such freeze-up can be expected to be limited to a relatively small number of contact points between individual rocks or pieces of gravel, which should make the freeze-up less structurally rigid than the freeze-up of a water-saturated soil.

Figure 5B:
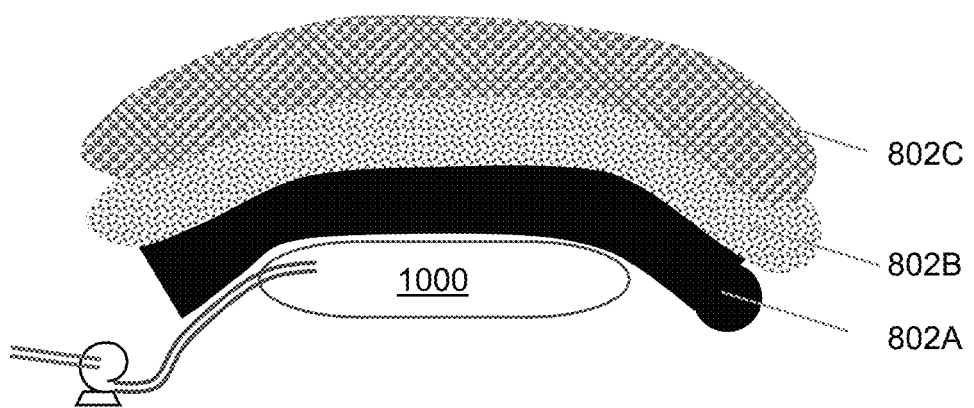
FIG. 5B shows an embodiment of the invention in which the overburden comprises layers of different coarseness, for preventing or lessening possible freeze-up of the overburden.

Referring now to FIG. 5B, in embodiments of the invention, proceeding in a direction of increasing depth into the overburden 800, the overburden 800 may comprise a plurality of layers (three layers as illustrated), such as coarse gravel 802C at the surface of the overburden 800, followed by intermediate gravel 802B (which may have smaller average particle size than gravel 802C) at a deeper location within the overburden 800, followed at a still deeper location by fine material 802A (which may be native soil) or sand comprising still finer particles than gravel 802B.

In an embodiment of the invention, the thickness of the layer of coarse material 802C such as gravel or aggregate can be chosen to be greater than the frost depth or freeze-distance of typical soil during typical winter climate conditions at the location of the installation, which may be a function of local geographic and climate conditions. In an embodiment of the invention, the thickness of the layer of coarse material 802C plus the thickness of the layer of intermediate material 802B can be chosen to be greater than the frost depth or freeze-distance of typical soil during typical winter climate conditions, which may be a function of local geographic and climate conditions. In an embodiment of the invention, the location of the layer of fine material 802A can be deeper into the overburden 800 than the frost depth or freeze-distance of typical soil during typical winter climate conditions. For example, the gravel or aggregate may be chosen such that at all locations above the frost line or freeze depth, the average size of the rocks or gravel is greater than 0.5 inch or 1 inch or 2 inches.

In regard to the substrate 600, in an embodiment, the substrate 600 could be native soil. Alternatively, the substrate 600, at least where it is in contact with the bag 1000 may be a material that is in some way processed or chosen to be "gentle" to the bag 1000. For example, the substrate 600, at least where it is in contact with the bag 1000, could be native soil material that is screened to remove possible rocks or similar components that could conceivably damage the bag 1000. The substrate 600, at least where it is in contact with the bag 1000, could be sand or even a material that is finer-grained than sand.

Although as illustrated in FIG. 5B a layer of a certain coarseness or fineness extends across the entire width of the bag 1000, with layer-to-layer variation in the vertical direction, it is not essential that such layer extend across the entire width of the bag 1000. It is possible that such variation of overburden 800 properties in the vertical direction could exist at a portion (such as the outer 25% of the width of the bag 1000 at each side of the bag 1000). At the same time, it is possible that in a central portion of the bag 1000 (such as the central 50% of the width of the bag 1000) the distribution of coarseness/fineness of the overburden 800 could have some other variation with vertical position, or even could be homogeneous and could even be native soil. It is believed (although it is not wished to be limited to this explanation) that for purposes of freeze-up prevention, it is more important to have the vertical coarseness/fineness variation above the outer regions of the bag 1000, and less important to have such variation above the central region of the bag 1000, because it is believed that in the outer region there is more shape change or local flow or motion of the overburden 800, and in the central region there is less of such shape change or local flow or motion of the overburden 800.

Distribution of Overburden Loading on the Bag, so that Bag Fills and Empties in a Deterministic Process, with Variation of Thickness of Overburden It can be understood that in some embodiments of the invention, in some situations such as a half-full extent of filling of the bag 1000 there can be slack in the upper layer 1030 of the bag 1000. That can be a somewhat indeterminate situation, in terms of exactly where in the bag upper layer 1030 the slack occurs and what is the detailed shape of the bag upper layer 1030. It is possible that the process of filling/emptying may cause the bag 1000 to deform by progressing through a random and unpredictable series of shapes. It may be desirable to provide a somewhat more deterministic sequence of events, in terms of where the slack occurs and how the bag 1000 fills or empties.

It can be estimated that for design conditions in which a desirably large amount of water is stored inside the bag 1000, the width dimension or surface area of the bag upper layer 1030 could be as much as ~20% larger than the side-to-side dimension of the midplane of the bag 1000 as installed. First of all, this implies that the bag material must change its shape to accommodate a shrinkage of possibly as much as about 20% in going from full to half-full, and then must again change its shape to accommodate an expansion of possibly as much as 20% in going from half-full to empty (or back to full). In addition, the soil (overburden 800) that is in contact with the surface of the bag upper layer 1030 must also do the same and contract or expand by approximately that same amount. Local expansion or separation of the soil in overburden 800 could potentially result in local cracks in the overburden 800 adjacent to the bag upper layer 1030 which could in turn lead to localized places at which the fluid pressure inside the bag 1000 is not locally reacted by appropriate material in the overburden 800.

Referring now to FIGS. 6A-6C, in an embodiment of the invention, it may be desirable to provide a non-uniform distribution of overburden 800 or weight on top of the bag 1000, in order to control how the bag upper layer 1030 is shaped during the middle portion of the charge/discharge cycle when the bag 1000 is approximately half-full. If the overburden 800 is of uniform composition and distribution, as in simple designs, then when the bag 1000 is at its half-full state there is excess area of the surface of bag upper layer 1030, which can be expected to form a wrinkled or wavy shape, at least in some places, but it may be difficult to predict the details of that wrinkled or wavy shape. If, instead, the loading exerted on the bag 1000 by the overburden 800 is nonuniform, it can be expected that at the place where the overburden 800 is heaviest, that portion of the bag will be the last to fill and the first to empty. Such a pattern might be desirable, because it could make the progression of bag shapes resembles a traveling wave, in contrast to the just-described indeterminate waviness, and at least the progression of the traveling wave would be somewhat predictable.

In an embodiment of the invention, the overburden 800 in some regions of the bag 1000 may press on the bag 1000 with a greater local pressure than does the overburden 800 in some other regions of the bag 1000. The variation of local pressure applied by the overburden 800 may vary from region to region of the bag in a continuous manner, which may be monotonically increasing, or alternatively there could be a more discrete variation. In any such situation, during the process of filling the bag 1000 the less-loaded portions of the overburden 800 may be lifted first, and the more-loaded portions may be lifted later in the process. Then, during emptying of the bag 1000, the last-lifted portion of the bag 1000 may be the first-to-settle portion of the bag 1000. In such an embodiment, the progression of events in terms of bag shape would cause the bag 1000 to fill and empty in a desired pre-determined manner by progressing through a pre-determined series of shapes in a pre-determined manner, which may somewhat resemble a traveling wave. This situation would be in contrast to the situation in which the bag 1000 is loaded by overburden 800 with a uniform distribution of loading, which is a condition that is believed to be associated with a somewhat random and unpredictable slack shape in the bag upper layer 1030 at and near the half-full condition of the bag 1000.

One way of achieving a nonuniform distribution of the pressure exerted on the bag 1000 by the overburden 800 involves varying the local density of the overburden 800. This is illustrated in FIG. 6A. Typical soil has a density of about 2000 kg/m^2, or slightly less. This describes typical soil that would be naturally available at the site of construction of the UPHS device. However, there are other possible bulk materials, having other densities, that could be used in the overburden 800 in select locations if desired. In general, overburden materials could be selected on the basis of their mass density and their economics. For example, based on considerations of availability and price, iron ore is one possible candidate bulk material that is more dense than typical soil. Iron ore, in bulk, has a typical density that is approximately 3000 kg/m^3. Iron ore as a solid material has a specific gravity that can be as large as 5150 kg/m^3 for a particular variety of iron ore, hematite. Of course, other materials also are possible.

More-dense material could be placed in desired locations in the overburden 800 to achieve variable loading of the bag 1000, which could achieve controlled progressive filling and emptying of the bag 1000 in a deterministic manner. In an embodiment of the invention, referring now to FIG. 6A, the overburden 800 could contain materials of different densities in different places within the overburden 800. For example, at locations where it is desired that the bag 1000 fill earliest during filling and empty last during emptying, the density of the overburden 800 could be smaller than it is at other locations.

Referring now to FIG. 6B, in an embodiment, another way of achieving such a non-uniform distribution of pressure applied to the bag upper layer 1030 by the overburden 800 is to vary the thickness of the overburden 800 among various places in the bag 1000. This could be used in a situation in which the composition of all of the overburden 800 is of substantially identical composition or of substantially density. This situation is illustrated in FIG. 6B, in which the bag 1000 is shown in cross-section and the thickness of the overburden layer increases monotonically from one side of the bag 1000 to the opposite side of the bag 1000. Other variations are also possible; for example, if the shape of the bag 1000 in plan view is approximately round, the variation of loading could be as a function of radial position with respect to the circular shape of the bag 1000.

Referring now to FIG. 6C, in an embodiment, it would also be possible to transport discrete solid objects that have desirable weights or densities and to place them in desired places on top of or within the overburden 800. Such solid objects could be nonuniformly distributed if desired in order to create a desired progression of filling and emptying.

In still further embodiments of the invention, both the nonuniform overburden density and the nonuniform overburden thickness could be used together to cause the bag 1000 to fill and empty such that the bag upper layer 1030 deforms in a desired pre-determined manner and progression of shapes. As illustrated in FIG. 6C, the region toward the right, having closer-together discrete solid objects is the last to fill and the first to empty.

Edge Support Structure

Referring now to FIGS. 7A-7E, embodiments of the invention may comprise a weld or joint 1040 between the bag upper layer 1030 and the bag lower layer 1020. One possibility is a face-to-face joint. A face-to-face joint has been disclosed in: A new principle for underground pumped hydroelectric storage, by Olsen et al., Journal of Energy Storage 2 (2015) 54-63. Referring now to FIGS. 7A-7E, in an embodiment of the invention, the weld or joint 1040 between the bag upper layer 1030 and the bag lower layer 1020 may be a face-to-face joint, in which a downward-facing surface of bag upper layer 1030 is joined to an upward-facing surface of bag lower layer 1020. Furthermore, in an embodiment, there may be provided an edge support structure 2800. The edge support structure 2800 may, at least partially, serve to resist the tendency of internal fluid pressure to tear or peel the face-to-face joint apart (at any location where such internal pressure might not be fully reacted by overburden 800). The edge support structure 2800 may have a desired bending stiffness in desired places.

The edge support structure 2800 may generally comprise two parts, i.e., edge support structure upper part 2830 and edge support structure lower part 2820. Edge support structure upper part 2830 and edge support structure lower part 2820 could be separately-manufactured parts or they could be manufactured as connected parts that are connected by a flexible hinge 2834. A flexible hinge 2834, sometimes referred to as a "living hinge," is a known feature in various molded or extruded plastic products. Typically, the flexible hinge 2834 or "living hinge" is thinner than most or all other regions of the part, so as to be able to undergo a larger amount of bending than most or all other regions of the part.

As illustrated, in an embodiment, edge support structure upper part 2830 and edge support structure lower part 2820 may have many features in common or in mirror-image relationship with each other. In other embodiments, edge support structure upper part 2830 could differ from edge support structure lower part 2820 in its geometry or its composition or both. Such difference may be in view of the fact that the loading conditions and motion over the course of a filling/emptying may differ for the edge support structure upper part 2830 compared to the edge support structure lower part 2820. This difference might result from the stationary nature of bag lower layer 1020 and the movable and shape-changeable nature of bag upper layer 1030.

In FIG. 7A, the edge support structure 2800 is shown unfolded or flat, which is how the various pieces could be placed at the beginning of the installation in the field. In FIG. 7C, the edge support structure 2800 is shown assembled or folded together to act as a clamp. In FIGS. 7A-7C, only the front (cross-sectional) shape of the edge support piece 2800 is shown (for convenience of illustration). In FIGS. 7D-7E, a more complete representation is shown. In an embodiment, the edge support piece 2800 could be extruded, i.e., it could be arbitrarily long in the direction into and out of the paper.

A first step in the installation process could be to lay the edge support piece 2800 or edge support structure lower part 2820 on the substrate (such as soil) 600 and then lay the two layers of the bag (bag lower layer 1020 and bag upper layer 1030) on top of the edge support structure 2800, specifically on top of edge support structure lower part 2820. It is possible that at the time of performing the face-to-face joint, the edge support structure 2800, specifically edge support structure lower part 2820, may, as illustrated, may already be in place underneath the about-to-be joined bag lower layer 1020 and bag upper layer 1030, and can serve as a backing surface for performing the weld or joining operation. This is shown in FIG. 7B, which represents (not to scale) the welding or joining process. The edge support structure lower part 2820 may then remain in place. It may be useful to have a well-defined solid surface (rather than loose soil) as a backing surface for performing the weld or joint 1040.

In FIG. 7C, as a later step, the edge support structure upper part 2830 is shown folded over so that it contacts the top surface of the bag upper layer 1030. The edge support structure 2800, in its folded-over configuration, may serve as sort of a clamp around the weld or joint 1040 of the bag 1000. Part of edge support structure 2800 may extend outward of the weld or joint 1040 and may be structural, and there, edge support structure lower part 2820 and edge support structure upper part 2830 may touch each other. Another part of edge support structure 2800 may extend inward of the weld or joint 1040 so as to clamp or partially clamp a portion of the bag 1000 that is inward of the weld or joint 1040.

In an embodiment of the invention, the edge support structure 2800, or at least a portion of it, may be stiffer in bending than the bag upper layer 1030. In an embodiment of the invention, the edge support structure 2800 can have bending stiffness properties that vary along the direction that approximately corresponds to the sideways direction of the bag 1000. For example, the thickness of the edge support structure 2800, as measured in a direction generally perpendicular to the external surface of the bag 1000, may be variable such as tapered. Tapering may be either linearly tapered or non-linearly tapered.

Referring now to FIGS. 7D-7E, this more-leftward (as illustrated) part of the edge support structure upper part 2830 is shown as being tapered. The same could be true for edge support structure lower part 2820. The taper can allow this part (especially edge support structure upper part 2830) to bend as needed as the bag 1000 fills and deforms, so as to provide support to the bag 1000 in a gradually varying manner. For example, as the bag 1000 gradually fills, the bag upper layer 1030 and bag lower layer 1020 might separate only at the most-tapered portion of the edge support piece 2800, and as the bag 1000 fills further, the tapered pieces (especially edge support structure upper part 2830) might separate further by bending at least at more of the tapered portion of edge support structure upper part 2830.

In FIGS. 7D-7E, a part of the edge support piece 2800 is also shown as having a region of constant thickness, although the constant thickness region is not essential.

The most-rightward (as illustrated) part of the edge support structure upper part 2830 is shown as being especially thick so as to provide greatest stiffness and to react the load or torque or bending moment received from the more-left (tapered) part of the edge support structure upper part 2830. In general, the local bending stiffness of edge support structure upper part 2830 can vary so as to be more stiff at the outer edge of the bag 1000 and less stiff closer to the center of bag 1000.

In an embodiment, a portion of the edge support structure 2800 may extend beyond the edge of bag 1000. In edge support structure 2830, the portion that extends beyond (outboard of) the edge of the bag 1000 may have a thickness or local bending stiffness that is greater than the thickness or local bending stiffness of any portion of the edge support structure upper part 2830 that is in contact with the bag 1000. Also shown are bolts 2880 (for example) that structurally connect edge support structure lower part 2820 and edge support structure upper part 2830 so that the edge support piece 2800 can serve as sort of a clamp grasping the edge of the bag 1000 and the weld or joint 1040 at the edge of bag 1000. (Of course, connectors other than bolts 2880 could alternatively be used, such as snaps or other features known in the art.)

Edge support structure lower part 2820 and edge support structure upper part 2830 are shown as being symmetrical or mirror-image in most of their features. It is also possible that, if desired, these parts could be different from each other.

The distance (moment arm distance) between the bolts 2880 and the rightmost edge of edge support structure upper part 2830 may have some importance (i.e., desirably the distance is not be extremely small), because this distance helps to provide moment that reacts the expansion or vertical spreading tendency caused by the bag 1000. The left (tapered) part 2832 of the edge support structure upper part 2830 can be expected to undergo bending as the bag 1000 fills and pressurizes. The varying amount of bending stiffness (due to the taper) may provide a gradual transition of how much support is provided to the bag 1000. This gradual transition should help avoid stress concentrations in the bag 1000. There is also shown a constant-thickness part 2834 overlying joint or weld 1040, although such For an embodiment, FIG. 7E shows the bag 1000 filled or at least partially filled, so that the bag upper layer 1030 starts to separate from the bag lower layer 1020, and as the bag upper layer 1030 lifts the overburden 800, the bag upper layer 1030 also causes bending in the edge support structure upper part 2830. The bent shape of edge support structure upper part 2830 gradually supports the bag upper layer 1030 near its edge, so that stress concentrations anywhere in the bag 1000 are reduced. There is a gradual transition between how much reaction force from the overburden 800 is exerted on the bag upper layer 1030 and how much reaction force from the edge support structure 2800 is exerted on the bag upper layer 1030. Far to the left (2832), where the edge support structure upper part 2830 is relatively thin or tapered, the behavior should be similar to the behavior where there is only overburden 800 above the bag 1000. At and near the weld or joint 1040, because of the clamping action of the edge support structure 2800, the edge support structure 2800 may be stiff enough so that little or no separation tendency is felt by the weld or joint 1040, and so there should be no opportunity for the internal water pressure to tear the weld or joint 1040 apart. Portion 2834 of edge support structure upper part 2830 is shown as being of constant thickness although this is not essential. Still further to the right, there may be a portion 2836 that is still thicker or stiffer.

In an embodiment of the invention, the edge support structure 2800 both can exert clamping or compressive (anti-peeling-apart force) on the weld or joint 1040 where the bag upper layer 1030 and the bag lower layer 1020 are joined to each other, and also can exert compressive (anti-peeling-apart force) on the bag upper layer 1030 and the bag lower layer 1020 at a place where the bag lower layer 1020 and the bag upper layer 1030 are not joined to each other.

In an embodiment of the invention, this design may provide support especially near the edge joint of the bag 1000 to prevent a face-to-face joint from opening up or peeling apart due to the internal pressure. The embodiment design may provide support in a localized (and controllable) manner that avoids or minimizes stress concentration factors. This left (tapered) part of the edge support piece undergoes bending as the bag fills and pressurizes. The varying amount of bending stiffness (due to the taper) provides a gradual transition of how much support is provided to the bag 1000. This gradual transition should help avoid stress concentrations in the bag 1000 and should ease the bending of bag upper layer 1030 at the place where the adhesive ends, and should reduce the maximum local angular bending of the bag upper layer 1030 anywhere near joint 1040. Such reduction of the maximum local angular bending of the bag upper layer 1030 anywhere near joint 1040 may have benefits in regard to fatigue of the bag material.

Edge Joint Comprising Additional Thicknesses of Bag Material

In an embodiment of the invention, there may be provided a joint 1040 between the bag upper layer 1030 and the bag lower layer 1020, having certain desired properties. In this embodiment, there may be provided a supplemental bag upper layer 1038 and/or a supplemental bag lower layer 1028. There may be provided more layers of bag material than just a single bag upper layer and a single bag lower layer. This may possibly be done in combination with where or whether certain layers are or are not joined to certain other layers. There may be different numbers of thicknesses of bag material in different places. This may accomplish variation of local bending stiffness of a desired portion of the bag 1000.

In Underground Pumped Hydro Storage, the bag 1000 is covered by a layer of overburden 800 that creates at least some of the pressure at which the water inside the bag 1000 is stored. In embodiments, the bag 1000 is large, having a horizontal dimension in the range of tens of meters or possibly even more than 100 meters. In embodiments, because of the large size of the bag 1000 and transportation limitations, the bag may be constructed "in the field" by bringing in smaller segments of bag material and joining them at the construction site to form the final bag 1000. Possible joining techniques, as known in the art, include thermal welding, ultrasonic welding, adhesive joining, and other techniques. Thermal welding or ultrasonic welding may involve localized melting or softening of the bag material, possibly with application of pressure or force in the region of the weld or joint, followed by re-solidification of the bag material.

In embodiments, one basic form of joint, a lap joint, may be used to join one piece of bag material to another piece of bag material to make bag lower layer 1020 or to make bag upper layer 1030. In such a lap joint, the downward-facing surface of one bag segment is contacted to the upward-facing surface of an adjacent bag segment, with some distance of overlap, and the surfaces that are in contact with each other are joined or welded. A typical lap joint is shown in FIG. 8A. The grey denotes bag material and the black denotes the joint. If the joint is an adhesive joint, the black could represent adhesive. If the joint is a thermal joint, in which the joint is made entirely of material that was originally part of one or another bag layer and no extraneous material is added, there black line at the joint would not indicate additional material, but simply would indicate the location of the joint.

Of some interest is the geometry at the external edge of the bag 1000. Referring now to FIG. 8B, one possible way of creating such an edge and joint is by forming a face-to-face joint (somewhat resembling the above lap joint except for the directions in which the long ends of the bag material extend beyond the joint). Such a joint can be made by placing one layer of bag material on top of another layer of bag material, and forming a joint 1040 having some sideways dimension. This joint 1040 would somewhat resemble the previously-described lap joint, except that in this situation, the end of the joint (where the two layers of bag material are no longer connected to each other) defines the beginning of the interior space of the bag 1000. This is illustrated in FIG. 8B, illustrating a simple face-to-face edge joint at the edge of bag 1000. Again, the dark line could represent adhesive, or it could simply represent the location of a weld that does not contain separate and distinct adhesive material.

In the situation of a USPH system, there may be a dish-shaped substrate 600 (not illustrated in FIGS. 8B-8D) below the bag lower layer 1020 supporting the bag lower layer 1020. Above the bag upper layer 1030 there may be an overburden layer (not illustrated in FIGS. 8B-8D). In such a situation, the pressure created by the overburden 800 would be expected to at least partially react the internal liquid pressure inside the bag 1000, although perhaps not perfectly. It is believed to be possible for the local internal fluid pressure to be larger than the pressure of the nearby overburden, due to the hydrostatic pressure of the water inside the bag 1000. For the simple design illustrated in FIG. 8B, it is appropriate to consider, in the immediate vicinity of the place where the joint 1040 ends and the interior space of bag 1000 begins, the possible existence of repeated flexing motion of the bag upper layer 1030 at or near the joint 1040, and a possible stress concentration, and a possible tendency for local forces to pull the joint 1040 apart. It is appropriate to consider that the sharp angle in the bag material can be an angle that experiences repeated flexing during repeated cycling of the bag 1000.

It can be seen from the simple illustrations herein that in a basic UPHS system with the illustrated simple joint design, the face-to-face joint itself 1040 (the double thickness of joined material) is generally likely to remain horizontal (or at least remain in a constant orientation) at all stages of filling and emptying of the bag 1000, due to considerations of symmetry and because the double-thickness face-to-face joint is likely to be always fully supported by the substrate 600, and the substrate 600 at the joint location is immobile and likely to be generally horizontal, and therefore the face-to-face joint is likely to be unmoving and always generally horizontal. Also, near the joint 1040, the bag lower layer 1020 is likely to remain immobile relative to the joint 1040, because generally the entire bag lower layer 1020 is likely to be fully supported by the substrate 600 and is likely to be substantially immobile at substantially all times during operation of the UPSH system.

In regard to the bag upper layer 1030, in embodiments, the bag upper layer 1030 is generally intended to change its position and its shape during the course of a cycle of filling and emptying the bag 1000. However, the bag upper layer 1030 comes into the just-described edge joint 1040, which is immobile due to the constraints of the support of the edge joint 1040 by the substrate 600. Therefore, there is likely to be some location where bag upper layer material that changes its shape during every filling-emptying cycle meets bag upper layer material that never changes its shape. Such point also may be located at a change of sectional shape or sectional thickness because of the increased thickness of the edge joint 1040. Therefore, such location deserves scrutiny as a possible lifetime-limiting point and a possible point at which it might be desirable to provide a special design such as a transition. In other industries producing manufactured products such as electrical cords, such a location may be provided with a transition that is sometimes referred to as a strain relief.

It can be noted that the bending stiffness of a rectangular beam, having width b and height (material thickness) h, as described by the moment of inertia of the cross-section of the beam, is given by $I=b*h^3/12$. Thus, if the moment of inertia of a single thickness of the bag material is considered to be 1, the moment of inertia of two thicknesses not joined together would be 2, and the bending stiffness of two thicknesses joined together would be 8. If there is any such tendency for localized bending of the bag upper layer 1030 to cause a problem, or for an internal-to-external pressure difference to cause a problem, a general strategy may be to try to cause less than all of the overall required bending or shape change or slope change to occur in the immediate vicinity of the edge joint, and for a remaining portion of the overall required bending or shape change or slope change to occur further away from the joint and to occur in a spatially distributed manner.

Referring now to FIGS. 8C-8E, in embodiments, there may be provided a supplemental bag upper layer 1036, which may be located above the bag upper layer 1030 and which may be joined to the bag upper layer 1030 to varying extents.

FIG. 8C shows, for an embodiment of the invention, a possible joint design, namely a face-to-face edge joint having a supplemental bag upper layer 1036 that exists at the main joint 1040 (where bag upper layer 1030 is joined to bag lower layer 1020) and extends inward of the main joint 1040 and as a separate layer unbonded to the bag upper layer 1030 inward of the main joint 1040. In this situation, inward of the main joint 1040, the bending stiffness of two layers of bag material where they are not bonded to each other is simply double the bending stiffness of one layer of bag material.

FIG. 8D shows a face-to-face edge joint having a supplemental bag upper layer 1036 that exists at the main joint 1040 (where bag upper layer 1030 is joined to bag lower layer 1020) and extends inward of the main joint and is bonded to the bag upper layer all the way inward. In this situation, inward of the main joint, the bending stiffness of two layers of bag material where they are bonded to each other is substantially stiffer than that of a single layer, but it is possible that the place where the double layer thickness ends leaving only a single layer may be a region that is not subject to such sharp angular bending as was illustrated in FIG. 8B.

FIG. 8E shows yet another configuration comprising still more forms of transition between various layers. In this embodiment, there are bag upper layer 1030 and supplemental bag upper layer 1036, which are bonded to each other for some distance inward from the main joint 1040, but then supplemental bag upper layer 1036 extends still further without being bonded to bag upper layer 1030. Regarding the progression of layers and thicknesses, innermost there is a single layer of thicknesses of material of bag upper layer 1030; progressing outward, that is followed by two thicknesses of material (supplemental bag upper layer 1036 and bag upper layer 1030) that are not connected to each other; followed by two thicknesses of material (supplemental bag upper layer 1036 and bag upper layer 1030) that are connected to each other; followed by the main joint 1040 in which there may be as many as four thicknesses of material connected to each other. It is believed that the geometry of this embodiment lessens the need for bending and shape change of material in the immediate vicinity of the main joint 1040, and provides a more gradual transition. Even though an innermost portion of supplemental bag upper layer 1036 is not connected to the bag layer that it faces, it may still contribute some bending stiffness making the overall transition of bending stiffness more gradual and makes the change of slope of the bag upper layer 1030 more gradual.

Thus, progressing along the bag upper layer 1030 from a centrally-located location outward, there is a progression of local bending stiffnesses. In the central region having only one thickness of bag material, the bending stiffness may be considered to have a relative value of 1 (resulting from a single thickness of the bag material). Next, there may be encountered a region where there is the same single thickness of bag upper layer material and also, just above it, a loose flap of supplemental bag upper layer 1036 comprising another single thickness of bag material. However, in general the unbound region of supplemental bag upper layer 1036 would be free to slide with respect to the bag upper layer 1030 as the bag upper layer 1030 changes shape. This region could be considered to have a relative bending stiffness of 2, representing the total bending stiffness of the two individual layers of bag material. Next, there may be encountered a region where there is the bag upper layer 1030 and the supplemental bag upper layer 1036 are joined to each other. This results in effectively a single layer having a thickness of 2*t. Thus, the moment of inertia for bending of this would be proportional to $(2t)^3$, so it would have a bending stiffness that is 8 times the bending stiffness of a single layer of bag material. Finally, there may be encountered a fully joined region that comprises (as illustrated) four thicknesses of bag material joined to each other. The bending stiffness of such a construct would be proportional to $(4t)^3$ so it would have a bending stiffness 64 times that of a single thickness of bag material. It can also be realized that regardless of the actual value of its bending stiffness, the thickest part of the edge joint 1040 may be effectively immobilized by construction details as discussed elsewhere herein. For these sample calculations, it is assumed and illustrated that the supplemental bag upper layer 1036 comprises material having the same thickness, and optionally the same material composition, as the bag upper layer 1030 to which it is partially joined. More generally, other dimensional choices and material choices are also possible, in which case the ratios could change. A supplemental bag lower layer 1026 on the underside of the bag 1000 (the bag lower layer 1020) is illustrated, which provides a certain degree of symmetry. However, supplemental bag lower layer 1026 is not essential. However, this bottom-most bag supplemental layer 1026 adjacent to the bag lower layer 1020 might be unnecessary because motion and deformation do not really occur there.

In embodiments as just described, the amount of flexing of the bag upper layer 1030 at the farthest-outward extent of the bag interior space is reduced, compared to what would occur in the baseline simple design of FIG. 8B, because at the farthest-outward extent of the bag interior space, the two-layer-thick portion of the bag upper layer is stiffer in bending than the single-layer thickness portion of the bag upper layer 1030, and therefore there is incentive for some of the bending to occur away from that edge joint 1040. It may be beneficial if the angular change does not all occur at a single joint.

Generally, in many practical situations, the material of which bag upper layer 1030 and bag lower layer 1020 are made would be constant-thickness material. Generally, also, the composition of such material may be uniform throughout such a bag layer, at least on a size scale greater than the size scale of any possible fibers or particulates that might be included in some versions of the bag material. Nevertheless, if desired, it would be possible to consider using bag materials that have some nonuniformity of thickness or some nonuniformity of composition or differ between bag upper layer 1030 and bag lower layer 1020. It might also be possible for the supplemental bag upper layer 1036 to be located in the interior of bag 1000 rather than on the exterior as illustrated.

Edge Piece in Construction of Bag

Referring now to FIGS. 9A-9D, in yet another embodiment of the invention, the bag 1000 may comprise a bag upper layer 1030 and a bag lower layer 1020 and, at the edge of the bag 1000, an edge piece 1050.

The bag upper layer 1030 and the bag lower layer 1020 may generally be made of flexible sheet material. For example, the sheet material may be made of polymer, or polymer that contains fibers, or fabric that is impregnated with polymer. For various practical reasons, a typical thickness of the bag upper layer 1030, or the bag lower layer 1020, may be in the range of 1 mm to 2 mm. Because for many purposes the overall size of the bag tends to be large (tens of meters or more), the bag upper layer 1030 and the bag lower layer 1020 may be made from smaller pieces of factory-made sheet material that may be joined to each other at seams or joints. It is possible that the seams or joints may be made at the site of installation of the UPHS ("in the field"). Such joints may be made thermally, ultrasonically, by adhesive, or by other means as known in the art. In an embodiment, the bag upper layer 1030 and the bag lower layer 1020 may be made of identical material of identical thickness. In another embodiment, the bag upper layer 1030 and the bag lower layer 1020 may be made of different materials or may have different thicknesses, or both. This could be in view of the fact that the bag upper layer 1030 and the bag lower layer 1020 may have different loading and service conditions, given that the bag lower layer 1020 may be substantially stationary while the bag upper layer 10030 moves and undergoes change of shape during a filling/emptying cycle.

In regard to the edge of the bag 1000, one known design option is a face-to-face joint. A face-to-face joint has been disclosed in: A new principle for underground pumped hydroelectric storage, by Olsen et al., Journal of Energy Storage 2 (2015) 54-63. In such a joint, any internal pressure of the fluid inside the bag that is not counterbalanced by external forces would act to separate the joint or tear or peel the joint apart. Another type of joint, which may be called a turn-around joint, is disclosed in U.S. Pat. No. 10,707,802. In such a joint, the bag lower layer 1020 of the bag material simply turns around at the bag edge and becomes the bag upper layer 1030, while maintaining a substantially continuous thickness and composition throughout the turn-around. If there is external (overburden 800) loading on such a bag 1000 in the absence of internal fluid pressure, there is the potential for forming a crease at the turn-around. The crease is a potential point of failure, especially with repeated cycles of creasing and internal pressurization. Accordingly, in U.S. Pat. No. 10,707,802, there is disclosed a shaped filler piece located at the turn-around in order to lessen the crease-forming tendency at the turn-around.

In an embodiment of the invention, there may be provided an edge piece 1050, which may be different dimensionally or compositionally from the sheet or fabric material that makes up the rest of the bag 1000, and yet may be suitable to be joined to the sheet or fabric material that makes up the rest of the bag 1000. For example, the edge piece 1050 may comprise a shaped middle piece, which may in cross-section have a teardrop shape for example, or generally a curved shape that is useful for reducing stresses and stress concentrations. This shape may transition into or be joined with pieces that are thinner or more uniform in thickness and may resemble the sheet or fabric that makes up the main portion of the bag 1000. More specifically, the edge piece 1050 may comprise an upper edge piece sheet portion, and a lower edge piece sheet portion. Here, the use of the term "sheet" in reference to the edge piece sheet portions is not meant to imply uniform thickness of such item.

As illustrated, the lower sheet edge piece portion may be longer in a transverse direction than the upper sheet edge piece portion. This inequality of length may facilitate field work in that it would be possible to make the lower joint of sheet material to the lower sheet edge piece portion without having to move the upper sheet edge piece portion out of the way in order to do so. However, other geometric relations are also possible.

The edge piece 1050 may have a bottom surface that is generally flat. The edge piece 1050 may have a maximum thickness (in the vertical direction) that is larger than the sum of thicknesses of the upper sheet edge piece portion and the lower sheet edge piece portion where they are intended to join the rest of the bag 1000, and larger than the total thicknesses of the bag upper layer 1030 and the bag lower layer 1020.

The upper sheet edge piece portion can have a thickness that varies in a continuous manner along the direction that is illustrated as side-to-side in FIG. 9D. The upper sheet edge piece portion, at the place where it is adjoins or merges with the shaped middle piece, may have a thickness that is larger than its thickness where it is intended to join the rest of the bag 1000. Similarly, the lower sheet edge piece portion is illustrated as having a thickness that varies in a continuous manner along the direction that is illustrated as side-to-side in the illustration. The lower sheet edge piece portion, at the place where it is adjoins or merges with the shaped middle piece, may have a thickness that is larger than its thickness where it is intended to join the rest of the bag 1000. These shapes and spatial variation of thicknesses may be chosen so that wherever flexing does occur near the shaped middle piece, such flexing occurs in material that is thicker than the material of the bag other than the edge piece.

In an embodiment of the invention, the edge piece 1050 may be such that its cross-sectional shape is repeated continuously and repeatedly along a lengthwise direction. Such a shape can be manufactured by extrusion. In an embodiment of the invention, the edge piece 1050 could be made of or comprise a polymer or rubbery substance. It is possible that some portions of the edge piece could contain fibers or fabric although it is not necessary that all of the edge piece 1050 contains fibers or fabric. The material of construction of the edge piece 1050, and its fibers or fabric or presence or absence thereof, could be the same as for the bag upper layer 1030 and the bag lower layer 1020, or could be different. The bag upper layer 1030 and the bag lower layer 1020 could be of identical composition and construction as each other, or different.

In an embodiment of the invention, the edge piece 1050 may be capable of being joined to the sheet material of the bag 1000. The joining could be performed by the same joining method that is used to join segments of sheet material together to produce the bag lower layer 1020 and the bag upper layer 1030 at the construction site.

The edge piece 1050 described herein could extend around the perimeter of the bag 1000. The overall shape of the bag 1000, in plan view, could be circular, or rectangular or rounded-rectangle, or in general any desired shape. As a result of providing this type of edge piece 1050, all field-constructed joints could be lap joints, which would be generally the same type of joint construction as ordinary lap joints that are routinely made to join segments of sheet material to each other during on-site construction.

In an embodiment of the invention, the edge of the bag 1000 would not be a face-to-face joint that would be subject to tearing apart or peeling apart under the influence of internal fluid pressure inside the bag 1000 that might be unreacted by overburden 800 in local places. Also, the described edge piece 1050 would not be subject to actual sharp creasing such as could occur with a simple turn-around construction of the edge of the bag 1000. In this embodiment, the described edge piece 1050 would not require the actual folding-back of large swaths of fabric at the construction site to create a turn-around joint. So, the described edge piece 1050 in this embodiment avoids having a face-to-face joint that would be subject to pulling-apart or peeling-apart due to internal pressure, while also avoiding the need to perform a folding-back step at the construction site.

Even if the overburden 800 provides a thorough locally distribution of applied force, it may be that the use of any of the herein-described edge support structure 2800 or supplemental layers 2836 or edge pieces 1050 may discourage the formation of a sharp bend angle in bag upper layer 1030 at whatever is the place where adhesion between the bag lower layer 1020 and the bag upper layer 1030 ends, or at any other joint involving bag upper layer 1030. Related to this, if such a bend does occur, such design features may reduce the magnitude of such bend angle. Repeated bending at the place where the adhesion ends is believed to be one possible factor in determining or limiting the usable lifetime of the bag 1000.

Antechamber and Robotic Device for Access to Bag Interior for Inspection or Maintenance Referring now to FIG. 10A-10F, in an embodiment of the invention, it is possible to provide a robotic device 2000 capable of performing inspection or maintenance or both, from the inside of the bag 1000, by looking at or working on the internal surface of the bag 1000. For example, the robotic device 2000 may be capable of traveling inside bag 1000.

In an embodiment of the invention, a suitable access port 1080 communicating with the interior space of bag 1000 may be provided. As illustrated in FIG. 6, the bag 1000 may comprise a stationary layer which may be the bag lower layer 1020, and a movable layer which may be the bag upper layer 1030. An access port 1080 may be located in the stationary bag lower layer 1020 by being joined to the bag lower layer 1020 at an opening through the bag lower layer 1020.

The access means may further include an antechamber 1084 defined at least in part by respective first pressure boundary door 1110, which may be in contact with interior space of bag 1000, and second pressure boundary door 1120, and optionally by walls between the first pressure boundary door 1110 and the second pressure boundary door 1120. The antechamber 1084 may be accessed by an access passageway 1090, which may be or may comprise a tunnel, which may extend through the material that makes up the substrate 600 under the bag 1000, and may extend out to an external space that is suitable for normal work activities.

The first pressure boundary door 1110 may be capable of withstanding a differential pressure that is equal to the internal pressure inside the bag 1000 during energy storage. The second pressure boundary door 1120 may also be capable of withstanding a differential pressure that is equal to the pressure that exists inside the bag during energy storage. The first pressure boundary door 1110 may be located at or near the bag lower layer 1020. The second pressure boundary door 1120 may be located further away from the access port 1080 and may for example be located within the access passageway 1090 that accesses the antechamber 1084.

The robotic device 2000 could be a vehicle such as a wheeled vehicle, as illustrated in FIGS. 10A-10E. It is still further possible that the robotic device 2000 could be a robotic submarine that is capable of operating inside the bag 1000 when the bag 1000 contains water, suitably to perform inspection/maintenance when the bag 1000 contains water. It is still further possible that the robotic device 2000 could be a drone that is capable of flying in the air-filled interior of the bag 1000, at least for purposes of inspection.

For certain versions of the robotic device 2000, a lifting device 2060 such as a scissors jack or an elevator may also be provided to lift the robotic device 2000 up from within the antechamber 1084 to the level of the bag lower layer 1020.

The robotic device 2000 could be connected to an external source by an umbilical cord. The umbilical cord may comprise electrical power cables, data transmission cables or even a hose for supplying a liquid patching material or the like. The umbilical cord may also provide a way of retrieving robotic device 2000, if necessary, by pulling robotic device 2000 back to antechamber 1084. In other embodiments, the robotic device 2000 could be untethered and could be self-powered and capable of operating by remote control, or the robotic device 2000 could even be autonomous. The robotic device 2000 could be capable of performing visual/camera inspection, or if desired it could be capable of performing repairs such as by applying a suitable substance to an internal surface of the bag 1000.

For an embodiment of the invention, a flowchart for inspection/maintenance procedures is shown in FIG. 10F. During normal operation of the system for energy storage, as illustrated in FIGS. 10A and 10B, the first pressure boundary door 1110 may be closed. This situation may resist the pressure of the operating liquid inside the bag 1000, while allowing the antechamber 1084 to contain the robotic device 2000 therein. In this situation, the conditions in the antechamber 1084 may be at ordinary atmospheric pressure and may be generally dry. In this situation, the second pressure boundary door 1120 could be either closed or open.

During inspection/maintenance, as illustrated in FIG. 10D, the first pressure boundary door 1110 may be open. This situation may allow the pressure of the fluid that is inside the bag 1000 to extend into the antechamber 1084. The second pressure boundary door 1120 may be closed, in order to resist the pressure of whatever fluid is inside the bag 1000 during inspection/maintenance. During inspection/ maintenance, such fluid could typically be air or some other gas at a pressure similar to the pressure that is inside when the bag 1000 is filled to store energy, so that the pressurized gas is able to lift the overburden 800 to a desired extent.

In an embodiment, a procedure for inspection/maintenance could be as described herein and as illustrated in FIGS. 10A-10E and in the flowchart in FIG. 10F: (1) with the first pressure boundary door 1110 closed, drain the bag of water as much as possible. (2) Provide compressed air inside the bag 1000 to raise the overburden and fill the bag 1000 to a desired extent, similar to what would happen when the bag is filled or partially filled with water during a normal energy storage cycle, or at least sufficiently for the robotic device 2000 to travel in the interior of bag 1000 as desired; (3) close the second pressure boundary door 1120; (4) pressurize the antechamber 1084 to a pressure substantially equal to the pressure inside the bag 1000 at the location of the antechamber 1084; (5) open the first pressure boundary door 1110; (6) send the robotic device 2000 into the interior of the bag 1000; and (7) perform inspection/repair. After the completion of inspection/maintenance activities, these steps could be generally reversed.

In an embodiment of the invention, the just-described system of antechamber 1084, first pressure boundary door 1110 and second pressure boundary door 1120, and the just-described procedure, could also be used such that the robotic device is a drone that is suitable to fly in the compressed gas that is inside bag 1000. The drone could be either tethered or untethered.

In an embodiment of the invention, it would also be possible to send a submarine into the interior of the bag 1000 using the just-described system of antechamber 1084, first pressure boundary door 1110 and second pressure boundary door 1120. The procedure would be similar to the just-described procedure, except that it would not be necessary to perform the water-draining and air-filling steps.

In an embodiment, it is also possible that the penetration or access port 1080 through the bag lower layer 1020 could serve as both a fluid flow connection to the bag 1000 for conduit 1094, and an access passageway 1090 for inspection/maintenance. This is also illustrated in FIG. 10E. Conduit 1094 may be in fluid communication with penetration or access port 1080 through bag lower layer 1020 while antechamber 1084 also is in fluid communication with penetration or access port 1080 through bag lower layer 1020. Conduit 1094 may lead to the pump or turbine of the energy storage and recovery system. In this embodiment, it is possible to provide access for maintenance/inspection without having to provide an additional or separate penetration through the bag lower layer 1020 specifically for the purpose of maintenance/repair.

Use of UPHS in Combination with Small Dam

The operational and physical characteristics of dams and hydropower vary according to the height of the dam (which roughly corresponds to the pressure head delivered to the turbine) and according to the volume of water stored behind the dam. Both of these parameters are relevant to the amount of energy that can be stored. The volume of water that can be stored can be expected to increase with the reservoir depth raised to the exponent 3 (approximately). And, pressure head increases with reservoir depth. At the upper end of these ranges of these quantities are large high dams such as Hoover Dam at the Nevada/Arizona border. At the low end are situations that are referred to as low-head hydro, run-of-river dams, and barrages. All dam construction is affected by local topographic conditions including slope of adjacent terrain. The situations referred to as low-head hydro, run-of-river dams, and barrages tend to be located in terrain that is less mountainous, have small dam heights or head heights, and therefore have only limited capacity to store energy or to vary the water flowrate through the dam and therefore the power output. Some of these low-head hydro dams and situations have almost no ability to vary the water flowrate. Thus, the power output from such an installation tends to be somewhat non-adjustable (non-dispatchable) resembling baseload power, and it changes only to the extent that the river flowrate is influenced by seasonal weather or rainstorms. Large hydroelectric installations such as Hoover Dam have been proposed as energy storage facilities (by using off-peak power from other sources to pump water from downstream back into the upstream reservoir after the water has run through the turbines). However, that mode of operation is associated with the fact that a very large reservoir volume is available at such a dam.

Referring now to FIG. 11, for purposes of load-leveling and accommodating the variability of wind and solar energy sources, it would be desirable to provide low-head hydro, which might not have much water storage volume or ability to adjust the power output, with a storage ability. Combining such a situation with UPHS would allow UPHS to provide that flexibility, and would allow UPHS to use the river as a discharge reservoir. The discharge reservoir can be either the river upstream of the dam or the river downstream of the dam. In fact, it is possible that the intake to the UPHS system can be upstream of the dam and the discharge of the UPHS system can be downstream of the dam. This provides some energy extraction from the river other than obtaining energy from the grid itself. The described system can take in off-peak energy from the grid for storage, and return that energy to the grid, but some of the stored energy can also be obtained from the river and the dam by taking input water from the upstream reservoir during charging of the UPHS, and by discharging water to the downstream river during discharging of the UPHS. During charging the pump would work against a smaller head because it would take water from upstream of the dam and would only have to work against the head of the overburden etc. of the UPHS. During discharging the turbine would experience a larger head because the discharge would be downstream of the dam. The discharging head would be the head of the overburden etc. of the UPHS plus the head of the elevation difference across the dam. The pump and turbine could be a single combined pump-turbine unit that is reversible, such as an axial-flow device. The elevational location of the turbine could be close to or at the bottom elevation of the dam, in order to avoid any possible worries about cavitation of the water. The turbine could even be below the bottom elevation of the dam. The UPHS device (bag) could be at approximately the elevation of the shore upstream of the dam. However, other elevations are possible for both the pump-turbine and the UPHS device. During charging of the UPHS device, the upstream valve Valve1 could be open and the downstream valve Valve 2 could be closed, and the pump-turbine could operate as a pump. During discharging of the UPHS device, the upstream valve Valve 1 could be closed and the downstream valve Valve 2 could be open, and the pump-turbine could operate as a turbine. It is also possible that the water to fill the bag could be taken from the upstream reservoir behind the dam. Valve 3 allows this.

So, this system of this embodiment of the invention could combine energy storage with low-head dams, and the low-head dams may already exist. In general, UPHS benefits from having a small local elevation difference if any such difference exists. Locating UPHS near a low-head dam provides that elevation difference as well as providing a source of water for filling the bag and ensuring that there is no need to construct a discharge reservoir.

The illustrated system offers the ability to discharge energy while the river flow itself is flowing through the turbine, which essentially increases the power production rate beyond what could be provided by the river flow at a given time. The illustrated system offers the ability to produce energy when the river is not flowing. The illustrated system when operated in the fill-from-upstream-reservoir mode provides the ability to essentially store energy of the river itself. The illustrated system in the fill-from-downstream-water mode provides the ability to receive energy from some external source and store it.

The illustrated system offers the ability to store water in the bag either by withdrawing water from the upstream reservoir, or by withdrawing water from the downstream body of water. Although such a system is illustrated at a dam, it could also be deployed in the vicinity of any naturally-occurring elevation difference in a river.

EMBODIMENTS

Aspects of the invention are further described by the following non-limiting embodiments.

Embodiment A1. An energy or fluid storage system comprising:
- a bag comprising a deformable boundary defining a bag interior that can be filled with said fluid and emptied of said fluid as desired, said bag being capable of occupying a less-filled configuration and a more-filled configuration; and
- a mass of overburden overlying said bag, said overburden being able to be raised and lowered as a function of a degree of filling of said bag interior,
- wherein said overburden has a variation in composition or particle size or particle size distribution from one location in said overburden to another location in said overburden.

Embodiment A2. The system of Embodiment A1, wherein said variation comprises overburden in contact with said bag at an outer edge of said bag having a smaller average particle size than overburden in contact with said bag at a central region of said bag.

Embodiment A3. The system of Embodiment A1, wherein said variation comprises overburden in contact with said bag at an outer 20% of a width of said bag having a smaller average particle size than overburden in contact with said bag at a center-most region of said bag that is a center-most 20% of a width of said bag.

Embodiment A4. The system of Embodiment A1, wherein said variation comprises overburden in contact with said bag at an outer 20% of a width of said bag having been sieved to remove sharp objects or objects larger than a specified size.

Embodiment A5. The system of Embodiment A1, wherein said variation comprises presence of sand in contact with said bag at an outer 20% of a width of said bag, and no presence of sand or less presence of sand in a center-most region of said bag that is a center-most 20% of a width of said bag.

Embodiment A6. The system of Embodiment A1, wherein said variation comprises overburden in contact with said bag at an outer edge of said bag being wetter than overburden in contact with said bag at a central region of said bag.

Embodiment A7. The system of Embodiment A1, wherein said overburden comprises a coarser layer and a finer layer, said coarser layer being located above said finer layer, wherein said system is located in a geographic location having a frost depth that characterizes a maximum depth of freezing of soil during winter, and wherein said coarser layer has a thickness that is greater than said frost depth.

Embodiment A8. The system of Embodiment A1, wherein said overburden comprises a coarser layer and a finer layer, said coarser layer being located above said finer layer, wherein said coarser layer comprises pieces of rock having an average size greater than 0.5 inch.

Embodiment A9. The system of Embodiment A8, wherein said coarser layer extends over an entire surface of said bag.

Embodiment A10. The system of Embodiment A1, wherein said nonuniform distribution of said pressure on said bag is achieved by providing said overburden having different local mass density in different places in said overburden.

Embodiment A12. The system of Embodiment A11, wherein some of said other overburden material comprises iron ore.

Embodiment B1. An energy or fluid storage system comprising:
- a bag, said bag comprising a deformable boundary defining a bag interior that can be filled with said fluid and emptied of said fluid as desired;
- a mass of overburden overlying said bag, said mass being able to be raised and lowered as a function of an extent of filling of said bag interior; and
- an irrigation hose buried within said overburden,
- wherein said irrigation hose is capable of delivering a liquid to specific locations within said overburden, and wherein said overburden has local flowability properties that are responsive to an amount of said liquid that has been delivered to local places within said overburden.

Embodiment B2. The system of Embodiment B1, wherein said irrigation hose, or a liquid delivery portion thereof, is capable of delivering said liquid to a portion of said overburden that, in a vertical-plane sectional view through said system, is located above an outer portion of said bag, said outer portion of said bag being horizontally near an outer edge of said bag, within 20% of an overall horizontal dimension of said bag in said sectional view.

Embodiment B3. The system of Embodiment B1, wherein said irrigation hose, or a liquid delivery portion thereof, is capable of delivering said liquid to a portion of said overburden that, in a vertical-plane sectional view through said system, is located vertically near said bag, with near being defined as above said bag and in a lowest 20% of a vertical dimension of said overburden.

Embodiment B4. The system of Embodiment B1, wherein said irrigation hose has walls that are perforated or porous.

Embodiment B5. The system of Embodiment B1, wherein said system comprises a plurality of said irrigation hoses, and wherein an operating system is capable of delivering said liquid selectively to desired ones of said irrigation hoses.

Embodiment B6. The system of Embodiment B1, wherein said overburden is surrounded, outward of said overburden, by soil that is less permeable to said liquid than said overburden is permeable to said liquid.

Embodiment B7. The system of Embodiment B1, wherein said irrigation hose has a path having a larger circumferential component than radial component.

Embodiment B8. The system of Embodiment B1, wherein said system further comprises an energy recovery system capable of recovering energy from said system when said fluid is exiting said bag.

Embodiment C1. An energy or fluid storage system comprising:
- a substrate, said substrate having a concave shape when viewed from above;
- a bag, overlying said substrate, said bag comprising a deformable boundary defining a bag interior that can be filled with said fluid and emptied of said fluid as desired; and
- a mass of overburden overlying said bag upper layer, said mass being able to be raised and lowered as a function of an extent of filling of said bag interior,
- wherein said overburden is such as to exert a local pressure on said bag that is distributed nonuniformly over said bag.

Embodiment C2. The system of Embodiment C1, wherein said distribution of said local pressure of said overburden is such that said local pressure is larger at one side of said bag and smaller at an opposed side of said bag.

Embodiment C3. The system of Embodiment C1, wherein said distribution of said local pressure of said overburden is such that said local pressure is smaller at a center of said bag and larger at a more exterior region of said bag.

Embodiment C4. The system of Embodiment C1, wherein said nonuniform distribution of said pressure on said bag is achieved by providing a nonuniform thickness, measured in a vertical direction, of said overburden.

Embodiment C5. The system of Embodiment C1, wherein said nonuniform distribution of said pressure on said bag is achieved by providing said overburden having different mass density in different places in said overburden.

Embodiment C6. The system of Embodiment C5, wherein some of said overburden is local soil moved within a construction site of said system, and other of said overburden is material, having a composition different from a composition of said local soil.

Embodiment C7. The system of Embodiment C5, wherein some of said other overburden material comprises iron ore.

Embodiment C8. The system of Embodiment C1, wherein said nonuniform distribution of said pressure on said bag is achieved by providing discrete solid objects in desired places within or atop said overburden.

Embodiment C9. The system of Embodiment C1, wherein said system further comprises an energy recovery system capable of recovering energy from said system when said fluid is exiting said bag.

Embodiment D1. An energy or fluid storage system comprising:
- a substrate, said substrate having a concave shape when viewed from above;
- a bag, overlying said substrate, said bag comprising a deformable boundary defining a bag interior that can be filled with said fluid and emptied of said fluid as desired, said bag comprising a bag upper layer and a bag lower layer; and
- a mass of overburden overlying said bag upper layer, said mass being able to be raised and lowered as a function of an extent of filling of said bag interior,
- wherein said bag lower layer and said bag upper layer are joined to each other at an edge of said bag with a face-to-face joint, and
- further comprising an edge support structure that is in contact with said bag upper layer and is in contact with said bag lower layer, wherein said edge support structure exerts force on said upper layer and said lower layer, urging said upper layer and said lower layer toward each other, at a place where said bag upper layer and said bag lower layer are not joined to each other.

Embodiment D2. The system of Embodiment D1, wherein said edge support is tapered increasing in thickness in the direction from a bag central region to a bag outer region.

Embodiment E1. A storage system comprising:
- a bag comprising a bag upper layer and a bag lower layer, said bag upper layer and said bag lower layer being joined to each other at an edge joint, said bag defining a bag interior space, said bag being capable of occupying a less-filled configuration and a more-filled configuration;
- a substrate that supports said bag lower layer and said edge joint, said substrate being generally immovable during change between said less-filled configuration and said more-filled configuration;
- an overburden, said over burden overlying said bag upper layer and said edge joint, at least some of said overburden being movable in response to a change between said less-filled configuration and said more-filled configuration;
- wherein said edge joint comprises a downward-facing surface of said bag upper layer joined to an upward-facing surface of said bag lower layer, said edge joint having an inner end and an outer end, said inner end helping to define said bag interior,
- wherein said bag further comprises a supplemental bag upper layer wherein said bag supplemental upper layer is joined to at least a portion of said edge joint and wherein said bag supplemental upper layer extends some distance inboard of said edge joint.

Embodiment E2. The system of Embodiment E1, wherein said bag supplemental layer is joined to said bag upper layer for some distance that is inboard of said edge joint.

Embodiment E3. The system of Embodiment E1, wherein said bag supplemental layer is unjoined with respect to said bag upper layer for some distance that is inboard of said edge joint.

Embodiment E4. The system of Embodiment E1, wherein said bag supplemental layer is joined to said bag upper layer for some distance that is inboard of said edge joint and is unjoined with respect to said bag upper layer for some further distance is inboard of said edge joint.

Embodiment E5. The system of Embodiment E1, wherein a transition from double-thickness to single-thickness occurs in a portion of said bag upper layer that is not directly at said edge joint but rather is in a region of said bag upper layer that is free to change its slope and its shape during a filling-emptying cycle of said bag.

Embodiment E6. The system of Embodiment E1, wherein said bag supplemental layer has composition and thickness identical to that of said bag upper layer.

Embodiment E7. The system of Embodiment E1, wherein said bag supplemental layer has a composition that is different from the corresponding composition of said bag upper layer.

Embodiment E8. The system of Embodiment E1, wherein said bag supplemental layer has a thickness that is different from the corresponding thickness of said bag upper layer.

Embodiment E9. The system of Embodiment E1, wherein said supplemental bag upper layer has a thickness that tapers in the inboard-outboard direction.

Embodiment E10. The system of Embodiment E1, wherein said supplemental bag upper layer is attached to a remainder of said bag by a joining technique that is different from a joining technique that is used to join said bag upper layer and said bag lower layer to each other.

Embodiment E11. The system of Embodiment E1, wherein, proceeding along an outward-inward direction, said bag upper layer in combination with said supplemental bag upper layer has at least three different local values of bending stiffness.

Embodiment F1. An energy or fluid storage system comprising:
- a substrate, said substrate having a concave shape when viewed from above;
- a bag, overlying said substrate, said bag comprising a deformable boundary defining a bag interior that can be filled with said fluid and emptied of said fluid as desired, said bag comprising a bag upper layer and a bag lower layer; and
- a mass of overburden overlying said bag upper layer, said overburden being able to be raised and lowered as a function of an extent of filling of said bag interior,
- wherein said bag upper layer is connected to an edge piece which in turn is connected to said bag lower layer, wherein said edge piece comprises features that are thicker than said bag lower layer and thicker than said bag upper layer.

Embodiment F2. The system of Embodiment F1, wherein said edge piece comprises an upper edge piece sheet portion, and a lower edge piece sheet portion and a shaped middle piece which may be integral with at least one of said edge piece sheet portions.

Embodiment F3. The system of Embodiment F2, wherein said shaped middle piece has a curved contour against which said upper edge piece sheet portion may rest for certain filling situations of said bag.

Embodiment F4. The system of Embodiment F2, wherein said upper edge piece sheet portion has a thickness that is non-constant, or said lower edge piece sheet portion has a thickness that is non-constant.

Embodiment F5. The system of Embodiment F2, wherein said upper edge piece sheet portion has a thickness that increases closer to said shaped middle piece, or said lower edge piece sheet portion has a thickness that increases closer to said shaped middle piece.

Embodiment G1. An energy or fluid storage system comprising:
- a substrate, said substrate having a shape that is concave when viewed from above;
- a bag comprising a bag upper layer and a bag lower layer that are joined to each other to define a bag interior that can be filled with said fluid and emptied of said fluid as desired, said lower layer resting on said substrate, said lower layer having an access hole therethrough;
- a mass of overburden overlying said bag upper layer, said mass being able to be raised and lowered as a function of an extent of filling of said bag interior;
- a passageway through said substrate providing access to said access hole;
- a first pressure boundary door that can cover said access hole and can withstand an operating pressure inside said bag; and
- a second pressure boundary door that can block said passageway and can withstand said operating pressure inside said bag.

Embodiment G2. The system of Embodiment G1, wherein an antechamber is a region between said first pressure boundary door and said second pressure boundary door, and wherein said antechamber can contain a machine for performing inspection or maintenance.

Embodiment G3. The system of Embodiment G1, wherein said access hole is also connected to a conduit that can conduct flow of said fluid into or out of said bag.

Embodiment G4. The system of Embodiment G1, further comprising an energy recovery means for obtaining energy from flow of said fluid leaving said bag.

Embodiment H1. A system for storing or producing energy, said system comprising:
- a river having an elevation difference from an upstream point to a downstream point;
- a deformable bag defining a bag interior that is capable of occupying a less-filled configuration and a more-filled configuration;
- an energy conversion device;
- a first fluid conduit in fluid communication with said river at said upstream point, and a second fluid conduit in fluid communication with said river at said downstream point and a third fluid conduit in fluid communication with said energy conversion device; and
- valving suitable to provide any of various flowpaths as desired between said upstream point, said downstream point and said deformable bag.

Embodiment H2. The system of Embodiment H1, further comprising a mass of overburden overlying said bag, said mass being able to be raised and lowered as a function of an extent of filling of said bag interior.

Embodiment H3. The system of Embodiment H1, wherein said energy conversion device comprises a reversible pump-turbine or comprises a pump and a turbine.

Embodiment H4. The system of Embodiment H1, wherein said energy conversion device is located at a location that is lower than an elevation of said downstream point, or is located at a location that is between said elevation of said downstream point and an elevation of said upstream point.

Embodiment H5. The system of Embodiment H4, wherein said energy conversion device is located at a location that is closer to said elevation of said downstream point than to said elevation of said upstream point.

Further Comments

Where reference is made to water, it is equally possible to refer to generally any liquid. Such liquid may, for example, be seawater, or any liquid, subject of course to economic considerations. Even more generally, it would be possible to use any fluid, even a gas such as air.

The bag 1000 can be generally of any shape. One possibility of bag shape is a shape that is generally elongated, having a longitudinal axis. The length of the bag 1000 along the longitudinal axis can be longer than a dimension of the bag 1000 in any other direction. In cross-section perpendicular to the longitudinal axis, the bag 1000, when it is filled or nearly filled, can have a cross-sectional shape that repeats itself along the longitudinal axis for some distance. Such a bag 1000 could be described as cylindrical or tubular (although it does not have to be round in cross-section). In such a bag, near the ends there could be a special geometry that is different from the geometry that repeats itself in the main part of the bag 1000. In other embodiments, the bag 1000 need not be so elongated as has just been described. In these other embodiments, in plan view, the bag 1000 could be round, square, square with rounded corners, rectangular, rectangular with rounded corners, or still other shape.

What is referred to as a reservoir, either a storage reservoir or a discharge reservoir, could in general be a plurality of reservoirs. In a plurality of reservoirs, the individual reservoirs could be of identical design, size and elevation, or could be of different designs or different sizes or different elevations, in any combination. In such a situation, plumbing and equipment could be provided to access the individual reservoirs in any combination and in any sequence.

In embodiments of the invention, it is possible that the storage bag could be located, with respect to neighboring terrain, either generally above the neighboring terrain, at approximately the same level as the neighboring terrain, or generally below the neighboring terrain. Any of these could be achieved by appropriate earthmoving or structure. An underground cavern could be a mine that is not in use, or a naturally occurring cavern, or a cavern created for the purpose. Any desired structure could be placed or constructed on top of the bag or on top of the overburden that overlies the bag. All of this is also true for the discharge bag if one is used.

Embodiments of the invention can be used for energy storage, as described, by including a pump or energy storage component and a turbine or energy recovery component. The pump and turbine could be either a single component or separate components. It is further possible that embodiments of the invention could be used for water storage in addition to or instead of for energy storage. Such purposes could include fire suppression, emergency response, municipal water supply, pressure stabilization, and other purposes. In such a situation, energy recovery might not be necessary.

Embodiments of the invention can also include variations and combinations of what has been disclosed, in any combination that is physically possible. Although embodiments of the invention have been disclosed, it is not desired to be limited thereby. The embodiments of the invention described above are intended to be merely exemplary; numerous variations and modifications will be apparent to those skilled in the art based on the disclosure. All such variations and modifications are intended to be within the scope of the present invention as defined in any appended claims.

In general, any combination of disclosed features, components and methods described herein is possible. Features described for one embodiment can be used in other embodiments. Steps of a method can be performed in any order that is physically possible.

All cited documents are incorporated herein by reference in their entirety.

Although embodiments have been disclosed, it is not desired to be limited thereby. Rather, the scope should be determined only by the appended claims.

We claim:

1. An energy or fluid storage system comprising:
   a bag comprising a deformable boundary defining a bag interior that can be filled with said fluid and emptied of said fluid as desired, said bag being capable of occupying a less-filled configuration and a more-filled configuration; and
   a mass of overburden overlying said bag, said overburden being able to be raised and lowered as a function of a degree of filling of said bag interior,
   wherein said overburden has a variation in composition or particle size or particle size distribution from one location in said overburden to another location in said overburden,
   wherein said variation comprises overburden in contact with said bag at an outer 20% of a width of said bag having a smaller average particle size than overburden in contact with said bag at a center-most region of said bag that is a center-most 20% of a width of said bag.

2. The energy or fluid storage system of claim 1, wherein said variation in composition comprises providing said overburden having different mass density in different places in said overburden.

3. The energy or fluid storage system of claim 2, wherein some of said overburden material comprises iron ore.

4. The energy or fluid storage system of claim 1, further comprising discrete solid objects placed on top of or within said overburden.

5. The energy or fluid storage system of claim 4, wherein said discrete solid objects are nonuniformly distributed with respect to said overburden.

6. The energy or fluid storage system of claim 1, wherein said variation provides an overburden compliance or flowability property that is different from one place to another within said overburden.

7. An energy or fluid storage system comprising:
   a bag comprising a deformable boundary defining a bag interior that can be filled with said fluid and emptied of said fluid as desired, said bag being capable of occupying a less-filled configuration and a more-filled configuration; and
   a mass of overburden overlying said bag, said overburden being able to be raised and lowered as a function of a degree of filling of said bag interior,
   wherein said overburden has a variation in composition or particle size or particle size distribution from one location in said overburden to another location in said overburden,
   wherein said variation comprises presence of sand in contact with said bag at an outer 20% of a width of said bag, and no presence of sand or less presence of sand in a center-most region of said bag that is a center-most 20% of a width of said bag.

8. An energy or fluid storage system comprising:
   a bag comprising a deformable boundary defining a bag interior that can be filled with said fluid and emptied of said fluid as desired, said bag being capable of occupying a less-filled configuration and a more-filled configuration; and
   a mass of overburden overlying said bag, said overburden being able to be raised and lowered as a function of a degree of filling of said bag interior,
   wherein said overburden has a variation in composition or particle size or particle size distribution from one location in said overburden to another location in said overburden,
   wherein said variation comprises overburden in contact with said bag at an outer edge of said bag being wetter than overburden in contact with said bag at a central region of said bag.

9. The energy or fluid storage system of claim 8,
   further comprising an irrigation hose buried within said overburden,
   wherein said irrigation hose is capable of delivering a liquid to specific locations within said overburden, and wherein said overburden has local flowability properties that are responsive to an amount of said liquid that has been delivered to local places within said overburden.

10. The energy or fluid storage system of claim 9, wherein said irrigation hose, or a liquid delivery portion thereof, is capable of delivering said liquid to a portion of said overburden that, in a vertical-plane sectional view through said system, is located above an outer portion of said bag, said outer portion of said bag being horizontally near an outer edge of said bag, within 20% of an overall horizontal dimension of said bag in said sectional view.

11. The energy or fluid storage system of claim 9, wherein said system comprises a plurality of said irrigation hoses, and wherein an operating system is capable of delivering said liquid selectively to desired ones of said irrigation hoses.

12. The energy or fluid storage system of claim 8, wherein said overburden is surrounded, outward of said overburden, by soil that is less permeable to liquid than said overburden is permeable to said liquid.

13. An energy or fluid storage system comprising:
a bag comprising a deformable boundary defining a bag interior that can be filled with said fluid and emptied of said fluid as desired, said bag being capable of occupying a less-filled configuration and a more-filled configuration; and
a mass of overburden overlying said bag, said overburden being able to be raised and lowered as a function of a degree of filling of said bag interior,
wherein said overburden has a variation in composition or particle size or particle size distribution from one location in said overburden to another location in said overburden,
wherein said overburden comprises a coarser layer and a finer layer, said coarser layer being located above said finer layer, wherein said system is located in a geographic location having a frost depth that characterizes a maximum depth of freezing of soil during winter, and wherein said coarser layer has a thickness that is greater than said frost depth.

14. The energy or fluid storage system of claim 13, wherein said coarser layer comprises pieces of rock having an average size greater than 0.5 inch.

15. The energy or fluid storage system of claim 14, wherein said coarser layer extends over an entire surface of said bag.

16. The energy or fluid storage system of claim 14, wherein said coarser layer is located over at least an outermost 25% of a width of said bag.

17. An energy or fluid storage system comprising:
a bag comprising a deformable boundary defining a bag interior that can be filled with said fluid and emptied of said fluid as desired, said bag being capable of occupying a less-filled configuration and a more-filled configuration; and
a mass of overburden overlying said bag, said overburden being able to be raised and lowered as a function of a degree of filling of said bag interior,
wherein, away from a central portion, said overburden is bounded by a wall,
wherein said wall extends upward to an elevation higher than an elevation of said overburden that touches said wall,
wherein said wall has a generally vertical configuration and extends down into a substrate that underlies said bag.

18. The energy or fluid storage system of claim 17, wherein said overburden has a variation in composition or particle size or particle size distribution from one location in said overburden to another location in said overburden.

19. The energy or fluid storage system of claim 17,
wherein said wall has an overburden side and an opposed side,
wherein at at least some places at a chosen elevation, said overburden side of said wall at said chosen elevation is in contact with said overburden, and on said opposed side of said wall at said chosen elevation said wall is not in contact with any solid material.

* * * * *